(12) United States Patent
Reynolds et al.

(10) Patent No.: US 6,925,052 B1
(45) Date of Patent: Aug. 2, 2005

(54) MULTI-CHANNEL NETWORK MONITORING APPARATUS, SIGNAL REPLICATING DEVICE, AND SYSTEMS INCLUDING SUCH APPARATUS AND DEVICES, AND ENCLOSURE FOR MULTI-PROCESSOR EQUIPMENT

(75) Inventors: Alastair Reynolds, Linlithgow (GB); Douglas John Carson, Englewood, CO (US); George Crowther Lunn, West Lothian (GB); William Ross MacIsaac, Fife (GB)

(73) Assignee: Agilent Technologies, Inc., Palo Alto, CA (US)

( * ) Notice: Subject to any disclaimer, the term of this patent is extended or adjusted under 35 U.S.C. 154(b) by 844 days.

(21) Appl. No.: 09/672,593

(22) Filed: Sep. 28, 2000

(30) Foreign Application Priority Data

Oct. 1, 1999 (GB) .............................................. 9923142
Oct. 1, 1999 (GB) .............................................. 9923143

(51) Int. Cl.[7] .......................... H04L 12/26; G06F 11/00
(52) U.S. Cl. ....................... 370/217; 370/244; 370/245; 385/16
(58) Field of Search ................................ 370/216–220, 370/241, 242, 244, 245, 254, 255, 389, 395.1, 397, 432, 536, 907; 709/201, 224; 714/11; 385/16, 17

(56) References Cited

U.S. PATENT DOCUMENTS

| | | | |
|---|---|---|---|
| 5,163,052 A | * 11/1992 | Evans et al. .................. 714/31 |
| 5,457,729 A | 10/1995 | Hamann et al. ................ 379/2 |
| 5,522,042 A | 5/1996 | Fee et al. | |
| 5,560,033 A | * 9/1996 | Doherty et al. ............. 713/340 |
| 5,649,100 A | 7/1997 | Ertel et al. ................ 395/200.1 |
| 5,751,932 A | 5/1998 | Horst et al. | |
| 5,771,225 A | 6/1998 | Iino ........................... 370/217 |
| 6,012,151 A | * 1/2000 | Mano ........................... 714/11 |
| 6,021,111 A | * 2/2000 | Soga .......................... 370/221 |
| 6,081,503 A | * 6/2000 | Bordogna et al. .......... 370/222 |
| 6,532,089 B1 | * 3/2003 | Asahi ........................... 398/82 |
| 2003/0033393 A1 | 2/2003 | Larson et al. ............... 709/222 |

FOREIGN PATENT DOCUMENTS

| | | |
|---|---|---|
| EP | 0 080 829 | 6/1983 |
| EP | 0 469 382 | 2/1992 |
| GB | 2 290 432 | 12/1995 |
| GB | 2 292 820 A | 3/1996 |
| GB | 2 352 064 | 1/2001 |
| NL | 1011398 | 4/1999 |
| WO | 99/46671 | 9/1999 |

* cited by examiner

*Primary Examiner*—Hassan Kizou
*Assistant Examiner*—Ahmed Elallam
(74) *Attorney, Agent, or Firm*—Ladas & Parry LLP

(57) ABSTRACT

A multi-channel network monitoring apparatus has input connectors for network signals to be monitored and four channel processors in a rack-mountable chassis/enclosure for receiving and processing a respective pair of incoming signals to produce monitoring results. Each processor operates independently of the others and is replaceable without interrupting their operation. LAN connectors enable onward communication of the monitoring results. A cross-point switch routes each incoming signal to a selected processor and can re-route a channel to another processor in the event of processor outage. Each processor has a self-contained sub-system of processing modules interconnected via a CPU-peripheral interface in a backplane, which provides a separate peripheral interface for each processor. The backplane provides locations for processors to lie horizontally across a major portion of the backplane area facing the front of the enclosure, and a location for an interface module over a minor portion of that area facing the rear, so as to provide external connectors at the rear of the enclosure. A power supply module is positioned over another portion of the backplane area, on the same side as the interface module. The location of the power supply module behind the backplane saves height and/or width in the rack.

17 Claims, 18 Drawing Sheets

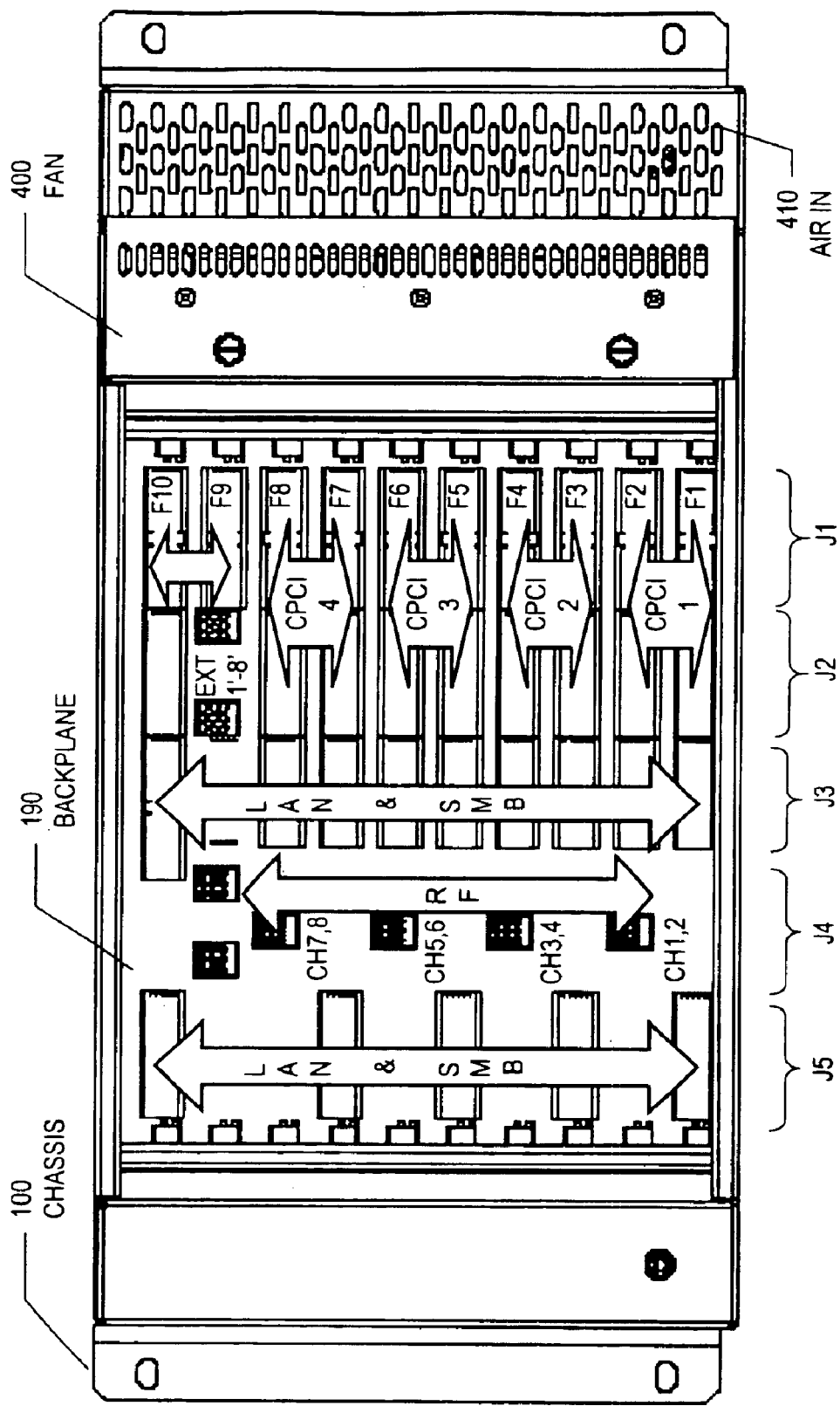
FIG. 15B (FRONT)

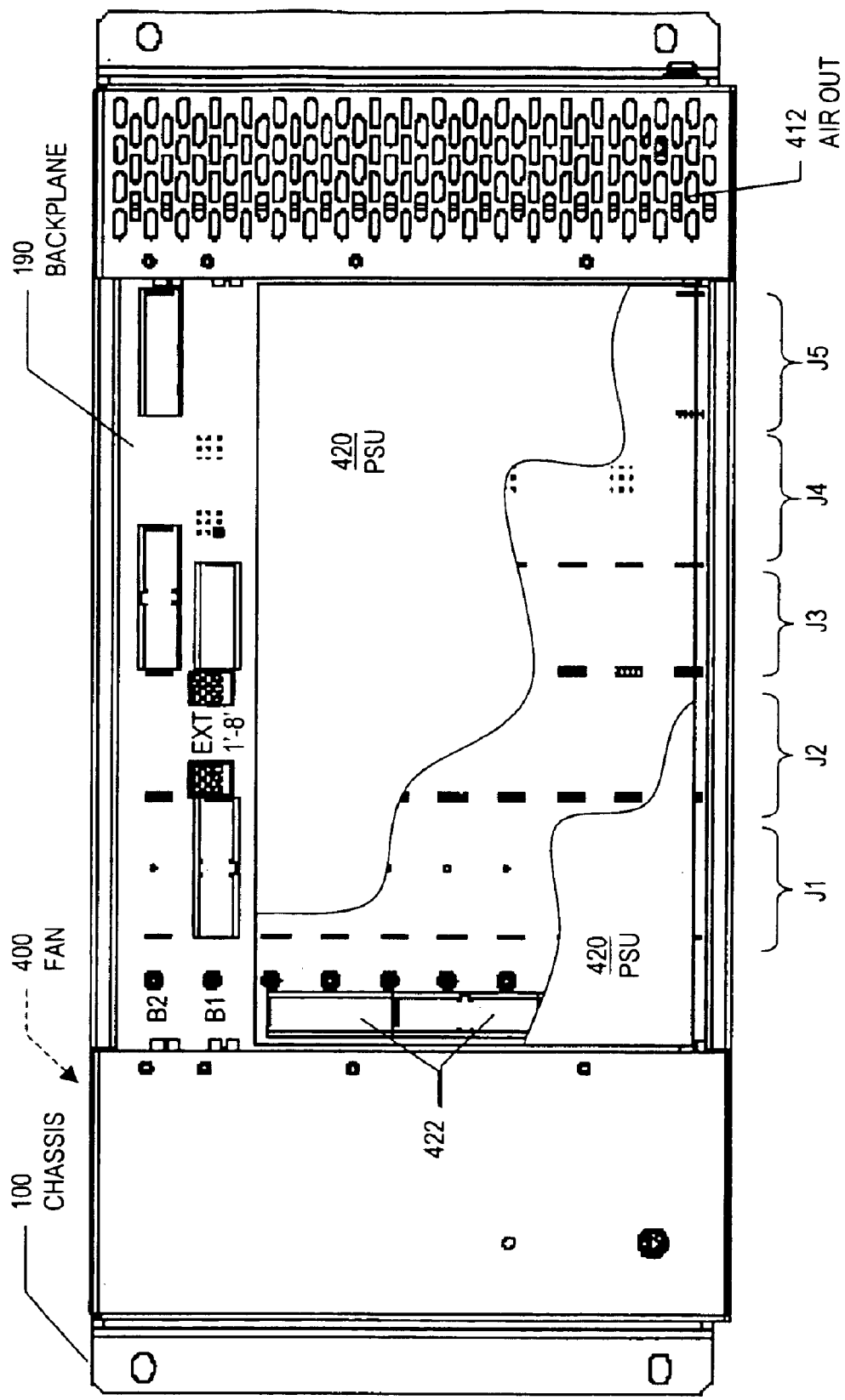
FIG. 15C (REAR)

MULTI-CHANNEL NETWORK MONITORING APPARATUS, SIGNAL REPLICATING DEVICE, AND SYSTEMS INCLUDING SUCH APPARATUS AND DEVICES, AND ENCLOSURE FOR MULTI-PROCESSOR EQUIPMENT

INTRODUCTION

The invention relates to telecommunications networks, and in particular to apparatus and systems for monitoring traffic in broadband networks.

In telecommunication networks, network element connectivity can be achieved using optical fibre bearers to carry data and voice traffic.

Data traffic on public telecommunication networks is expected to exceed voice traffic with Internet Protocol (IP) emerging as one data networking standard, in conjunction with Asynchronous Transfer Mode (ATM) systems. Voice over IP is also becoming an important application for many Internet service providers with IP switches connecting IP networks to the public telephony network (PSTN). IP can be carried over a Sonet transport layer, either with or without ATM. In order to inter-operate with the PSTN, IP switches are also capable of inter-working with SS7, the common signalling system for telecommunications networks, as defined by the International Telecommunications Union (ITU) standard for the exchange of signalling messages over a common signalling network.

Different protocols are used to set up calls according to network type and supported services. The signalling traffic carries messages to set up calls between the necessary network nodes. In response to the SS7 messages, an appropriate link through the transport network is established, to carry the actual data and voice traffic (the payload data) for the duration of each call. Traditional SS7 links are time division multiplexed, so that the same physical bearer may be carrying the signalling and the payload data. The SS7 network is effectively an example of an "out of band" signalling network, because the signalling is readily separated from the payload. For ATM and IP networks, however, the signalling and payload data is statistically multiplexed on the same bearer. In the case of statistical multiplexing the receiver has to examine each message/cell to decide if it is carrying signalling or payload data. One protocol similar to SS7 used in such IP networks is known as Gateway Control Protocol (GCP).

The monitoring of networks and their traffic is a fundamental requirement of any system. The "health" of the network must be monitored, to predict, detect and even anticipate failures, overloads and so forth. Monitoring is also crucial to billing of usage charges, both to end users and between service providers. The reliability (percentage availability) of monitoring equipment is a prime concern for service providers and users, and many applications such as billing require "high availability" monitoring systems, such that outages, due to breakdown or maintenance, must be made extremely rare.

A widely-used monitoring system for SS7 signalling networks is acceSS7 ™ from Agilent Technologies (and previously from Hewlett-Packard). An instrument extracts all the SS7 packetised signals at Signalling Transfer Points (STPs), which are packet switches analogous to IP routers, that route messages between end points in SS7 networks. The need can be seen for similar monitoring systems able to cope with combined IP/PSTN networks, especially at gateways where the two protocols meet. A problem arises, however, in the quantity of data that needs to be processed for the monitoring of IP traffic. In Internet Protocol networks, there is no out of band signalling network separate from the data traffic itself. Rather, routing information is embedded in the packet headers of the data transport network itself, and the full data stream has to be processed by the monitoring equipment to extract the necessary information as to network health, billing etc. Moreover, IP communication is not based on allocating each "call" with a link of fixed bandwidth for the duration of the call: rather bandwidth is allocated by packets on demand, in a link shared with any number of other data streams.

Accordingly, there is a need for a new kind of monitoring equipment capable of grabbing the vast volume of data flowing in the IP network bearers, and of processing it fast enough to extract and analyse the routing and other information crucial to the monitoring function. The requirements of extreme reliability mentioned above apply equally in the new environment.

Networks such as these may be monitored using instruments (generally referred to as probes) by making a passive optical connection to the optical fibre bearer using an optical splitter. However, this approach cannot be considered without due attention to the optical power budget of the bearer, as the optical splitters are lossy devices. In addition to this, it may be desirable to monitor the same bearer many times or to monitor the same bearer twice as part of a backup strategy for redundancy purposes. With available instrumentation, this implies a multiplication of the losses, and also disruption to the bearers as each new splitter is installed. Issues of upgrading the transmitter and/or receiver arise as losses mount up.

The inventors have analysed acceSS7 network monitoring systems (unpublished at the present filing date). This shows that the reasons for lack of availability of the system can be broken down into three broad categories: unplanned outages, such as software defects; planned outages, such as software and hardware upgrades; and hardware failures. Further analysis shows that the majority of operational hours lost are caused by planned and unplanned maintenance, while hardware failures have a relatively minor effect. Accordingly, increasing the redundancy of disk drives, power supplies and the like, although psychologically comforting, can do relatively little to improve system availability. The greatest scope for reducing operational hours lost and hence increasing availability is in the category of planned outages.

In order to implement a reliable monitoring system it would therefore be advantageous to have an architecture with redundancy allowing for spare probe units that is tolerant of both probe failure and probe reconfiguration, and provides software redundancy.

Monitoring equipment designed for this purpose does not currently exist. Service providers may therefore use stand-alone protocol analysers which are tools really intended for the network commissioning stage. These usually terminate the fibre bearer, in place of the product being installed, or they plug into a specific test port on the product under test. Specific test software is then needed for each product. Manufacturers have alternatively built diagnostic capability into the network equipment itself, but each perceives the problems differently, leading to a lack of uniformity, and actual monitoring problems, as opposed to perceived problems, may not be addressed.

Further considerations include the physical environment needed to house such processing architecture. Such a hardware platform should be as flexible as possible to allow for changes in telecommunications technology and utilise standard building blocks to ensure cross platform compatibility. For example, there exist standards in the USA, as set out by the American National Standards Institute (ANSI) and Bellcore, which differ from those of Europe as set by the European Telecommunications Standards Institute (ETSI). Versions of SS7 may also vary from country to country, owing to the flexibility of the standard, although the ITU standard is generally used at international gateways. The USA Bellcore Network Equipment-Building System (NEBS) is of particular relevance to rack-mounted telecommunications equipment as it provides design standards for engineering construction and should be taken into account when designing network monitoring equipment. Such standards impose limitations such as connectivity and physical dimensions upon equipment and, consequently, on cooling requirements and aisle spacing of network rack equipment.

It is known that standard processing modules conforming for example to the cPCI standard are suitable for use in telecommunication applications. The further standard H. 110 provides a bus for multiplexing baseband telephony signals in the same backplane as the cPCI bus. Even with Intel Pentium™ or similar processors, however, such arrangements do not currently accommodate the computing power needed for the capture and analysis of broadband packet data. Examples of protocols and their data rates to be accommodated in the monitored bearers in the future equipment are for example DS3 (44 Mbit.s$^{-1}$), OC3 (155 Mbit.s$^{-1}$), OC12 (622 Mbit.s$^{-1}$) and OC48 (2.4 Gbit.s$^{-1}$). Aside from the volume of data to be handled, conventional chassis for housing such modules do not also support probe architectures of the type currently desired, both in terms of processing capability and also to the extent that their dimensions do not suit the layout of telecommunication equipment rooms such as may be designed to NEBS allowing them to co-reside with network equipment.

For example, the typical general purpose chassis provides a rack-mounted enclosure in which a backplane supports and interconnects a number of cPCI cards, including a processor card and peripheral cards, to form a functional system. The cards are generally oriented vertically, with power supply (PSU) modules located above or below. Fans force air through the enclosure from bottom to top for cooling the modules. A peripheral card may have input and output (I/O) connections on its front panel. Alternatively, I/O connections may be arranged at the rear of the enclosure, using a special "transition card". Examples of rack widths in common use are 19 inch (483 mm) and 23 inch (584 mm). The siting of racks in telecommunications equipment rooms implies an enclosure depth should be little over 12 inches (305 mm). However, cPCI and VME standard processor cards and compatible peripheral cards are already 205 mm deep (including mountings) and the conventional interface card mounted behind the back plane adds another 130 mm. Moreover, although parts of the connector pin-outs for cPCI products are standardised, different vendors use other connectors differently for management bus signals and for LAN connections. These variations must also be adapted to by dedicated interconnect, and designs will often assume that cards from a single vendor only are used.

In a first aspect the invention provides a rack-mountable enclosure comprising a housing and interconnection backplane for the mounting and interconnection of a plurality of card-shaped processing modules and at least one interface module, the interface module being arranged to provide a plurality of external connectors and to transport signals via the backplane between each external connection and an individual processing module, wherein:

said backplane provides locations for said processing modules to lie across a major portion of the backplane area facing a front side of the enclosure;

said backplane provides a location for said interface module over a minor portion of the backplane area facing a rear side of the enclosure, so as to provide said external connectors at the rear of the enclosure; and a power supply module for powering the modules within the enclosure is positioned over another portion of the backplane area, on the same side as the interface module.

This arrangement allows a compact housing to contain several processing modules and to receive a corresponding number of external connections, in a more compact and functionally dense manner than known instrument chassis designs. In particular, the location of the power supply module behind the backplane saves height and/or width in the rack.

It will be understood that "front" and "rear" are used for convenience, and their meanings can be reversed. One particular benefit of the specified arrangement is that all external connectors (and hence the associated cabling) can be located on one side of the enclosure, allowing consistent access for all cables at the rear in the crowded equipment rooms common to telecommunication and other installations. Using cPCI standard processor and peripheral cards, the depth of the enclosure can be kept within or close to 12 inches (305 mm), no greater than the surrounding telecommunication equipment.

The enclosure may be constructed so that the processor modules lie generally horizontally when the enclosure is rack mounted. Air paths may be defined through the enclosure so as to pass from end to end thereof, along and between the processor modules and, if necessary, the power supply and interface modules. Fans may be included, optionally in a redundant configuration, to ensure adequate air flow to cool the various components of the enclosure.

The external connectors may provide inputs, outputs or both. In a telecommunications network probe application, the transport of data in the backplane will generally be inward, from the external connectors to the processing modules. In particular, external input connectors may be provided by the interface module for broadband telecommunications signals, with high bandwidth interconnections provided in the backplane. In principle, the backplane could include optical interconnects. With present technology, however, any necessary optical to electrical conversion will more likely be included in the interface module. In other applications, for example process control or computer telephony, the transport may be in both directions, or outwards only. The transport via the backplane may be in essentially the same format in which it arrives. Alternatively, the interface module may change the format, for example to multiplex several of the external signals onto a single pair of conductors in the backplane. The enclosure and modules will find particular application wherever a large quantity of data needs to be processed at speed, and reduced by filtering and aggregation to provide information for use elsewhere.

For flexibility and particularly for redundancy in fault and maintenance situations, the enclosure may provide a location for at least one switching module, whereby routing of signals between the external connectors and individual processing modules can be varied. The switching module may in particular comprise a cross-point switch, in accordance with another aspect of the invention, set forth in more detail elsewhere. It is assumed in that case that the processing modules are "hot-swappable", so that operation of other modules is unaffected by module replacement. The switching module may be operable to route signals between one external connector and a plurality of processing modules. This allows increased processing capacity to be provided for each external connector, whether this is used for redundancy or merely to add processing functionality.

For additional redundancy in larger systems, the switching module and interface module may provide for re-routing one of said signals from an external input connector to an additional output connector, to allow processing in another enclosure. The number of external input connectors may exceed the capacity of processing modules that can be accommodated, or may match it.

The backplane may separately provide local bus interconnections for communication between the processing modules. Said local bus interconnections may include a processor-peripheral parallel bus, for example cPCI. The processing module locations may be subdivided into groups, each group receiving a set of separately pluggable modules which together co-operate for processing of a given external signal. The backplane may in particular provide a plurality of independent local buses, each for communication between the modules of one group. The groups may each include a first processor module having specific capability for a type of input signal (such as IP packet data) to be analysed, and a second processor module of generic type for receiving partially processed data from the first processor module, and for further processing and reducing said data for onward communication.

The first and second processing modules can be regarded as packet and probe processor modules respectively, each such pair forming a self-contained probe unit. It will be understood that each probe processor card may be served by more than one packet processor card, and references to pairs should not be construed as excluding the presence of a further packet processor module in any group.

In the specific embodiments disclosed herein, two separate interface modules are provided at the rear side of the backplane. A first interface module, being the one referred to above, is for the signals to be processed (which broadly could mean input signals to be analysed or output signals being generated). A second interface module is provided for communication for control and management purposes, such as the onward communication of the processing results via LAN. These modules could of course be combined in one physical module, or further sub-divided, according to design requirements.

The external outputs may be connections to a computer Local Area Network (LAN), which can also provide for remote control and configuration of the processing modules. For redundancy of operation, the LAN connections in the backplane can be unique to each module, and can further be duplicated for each module. Alternatively, all modules can communicate via a common LAN. The backplane may provide a dedicated location for a management module for selective routing of the LAN or other output communications from the external connectors to the processing modules.

The backplane may further provide a communication bus connecting all modules, for management functions including for example power and cooling management. Said interconnections may for example include an $I^2C$ or SMB bus carrying standard protocols. For improved redundancy, separate buses may be provided for each sub-system.

Combining the above features, according to a particular embodiment of the invention in its first aspect, the backplane may provide:

a plurality of pairs of processing module locations, each pair comprising adjacent first and second processing module locations;

a plurality of independent communication buses each extending between the first processing module location and second processing module location of a respective one of said pairs;

a plurality of independent interconnections each for bringing a different external input signal from said interface module to a respective one of said first processing module location;

one or a plurality of independent interconnections for bringing communication signals from said second processing module locations to a second interface module.

The enclosure and backplane may further provide a location for a communication and management module to provide one or more of the following functions:

routing of processing module communication and management signals;

communication (e.g. LAN) switching to route communications from the processing modules to the outside world with sufficient redundancy and bandwidth;

"magic packet" handling, to allow remote resetting of the modules within the enclosure; and environmental control, controlling fan speed in response to operating temperatures sensed on each module.

Alternatively, the first aspect of the invention provides a rack-mountable enclosure comprising a housing, a power supply module, a fan assembly and an interconnection backplane for the mounting and interconnection of a plurality of card-shaped processing modules, wherein the processing modules in use are arranged to lie generally horizontally in front of the backplane and generally parallel with one another, the power supply module is located behind the backplane, and the fan assembly is located to left or right of the processing modules (in use, as viewed from the front) so as to provide a generally horizontal airflow between them.

A shared interface module or modules for providing external connections to the backplane and hence to all of the processing modules may also be located behind the backplane.

It is noted at this point that the cPCI standard defines a number of physical connectors to be present on the backplane, but only two of these (J1, J2) are specified as to their pin functions. Although the second processing modules mentioned above are generic processor cards based for example on Pentium (™ of Intel Corp.) microprocessors, different card vendors use the remaining connectors differently for communication and management signals such as SMB and LAN connections.

According to a second aspect of the invention a multi-processor equipment enclosure provides a housing and a backplane providing locations for a plurality of processing modules, and further providing a plurality of locations for a configuration module corresponding to respective processing module locations, each configuration module adapting the routing of communication and management signals via the backplane, in accordance with the vendor-specific implementation of the processing module.

The configuration module locations may be on the backplane, or on another card connected to the backplane. In the preferred embodiment, a communication and management module is provided at a specific location, and the configuration module locations are provided on the management module.

In an alternative solution according to the second aspect of the invention, a multi-processor processor equipment enclosure provides a housing and a backplane providing interconnect for a plurality of processing modules and a management module, the backplane interconnect including generic portions standardised over a range of processing modules and other portions specific to different processing modules within said range, wherein said management module is arranged to sense automatically the specific type of processing module using protocols implemented by the modules via connections in the generic portion of the interconnect, and to route communication and management signals via the backplane, in accordance with the specific implementation of each processing module.

The type sensing protocols may for example be implemented via geographic address lines in the standardised portion of a compact PCI backplane.

It is noted that known chassis designs and backplanes do not provide for several channels of signals to be monitored by independent processing sub-systems within the same chassis, especially when each monitoring unit processor in fact requires more than one card slot for its implementation. In particular, for monitoring of broadband communication signals in IP or similar protocols, it is presently necessary to provide a first processing module dedicated to a first stage of data acquisition and processing, where the sheer quantity of broadband data would defeat a general-purpose processor card, and a second processing module of generic type, for further processing onward reporting of the data processed by the first processing module.

According to a third aspect of the invention a computer equipment chassis provides a housing and backplane providing locations for at least four independent processing subsystems, each processing sub-system comprising first and second processing modules separately mounted on the backplane at adjacent locations, wherein the backplane provides at least four independent CPU-peripheral interfaces, each extending only between the adjacent locations of said first and second processing modules, the first processing module operating as a peripheral and the second processing module operating as host.

The enclosure and backplane may further provide a location for a multi-channel interface module providing external connections for all of the processing sub-systems, the backplane routing signals from the interface module to the appropriate processing sub-systems. The enclosure and backplane may further provide a location for a switching module, such that each external connection can be routed and re-routed to different processing sub-systems.

The backplane may further provide interconnections between the channel processors for communication externally of the enclosure. The enclosure and backplane may further provide a management module location for routing of said communication from the channel processors to external connectors. Said interconnections may form part of a computer local area network (LAN). The enclosure and backplane may in fact provide multiple redundant network connections in order that said onward communication can continue in the event of a network outage.

The inventors have recognised that, particularly because passive optical splitters have extremely high reliability, a probe architecture which provides for replication and redundancy in the monitoring system after the splitter would allow all the desired functionality and reliability to be achieved, without multiple physical taps in the network bearer, and hence without excessive power loss and degradation in the system being monitored.

In a fourth aspect the invention provides a multi-channel network monitoring apparatus for the monitoring of traffic in a broadband telecommunications network, the apparatus comprising:

a plurality of external input connectors for receipt of network signals to be monitored;

a plurality of channel processors mounted within a chassis, each for receiving and processing a respective incoming signal to produce monitoring results for onward communication, the incoming network signals individually or in groups forming channels for the purposes of the monitoring apparatus, each channel processor being arranged to operate independently of the others and being replaceable without interrupting their operation;

one or more external communication connectors for onward communication of said monitoring results from the channel processors; and a switching unit;

wherein the external input connectors are connected to the channel processors via said switching unit, the switching unit in use routing each incoming signal to a selected channel processor and being operable to re-route an incoming channel to another selected channel processor in the event of processor outage.

The switching unit may further be operable to connect the same incoming channel simultaneously to more than one channel processor. The same bearer can therefore be monitored in different ways, without the need for another physical tap.

The channel processors may be in the form of modules mounted and interconnected on a common backplane. The switching unit may comprise a further module mounted on said backplane. The external input connectors may be provided by a common interface module separate from or integrated with the switching unit.

The external communication connectors may be connected to the channel processors via a communication management module and via the backplane. The external communication connectors and communication management module may optionally provide for said onward communication to be implemented over plural independent networks for redundancy. Redundancy of the networks may extend to each channel processor itself providing two or more network connections. In the particular embodiments described, the backplane provides an independent connection between each respective channel processor and the communication management module. This provides better redundancy than shared network communication.

The channel processors may each comprise a self-contained sub-system of host and peripheral processing modules interconnected via a CPU-peripheral interface in the backplane, the backplane providing a separate peripheral interface for each channel processor. The interconnection may in particular comprise a parallel peripheral interface such as cPCI.

The backplane and card-like modules may be provided in a single rack-mountchassis, which may also house a power supply and cooling fans. These may be arranged internally in accordance with the first aspect of the invention, as set forth.

The switching unit may be operable to route any incoming signal to any of the channel processors. The switching unit may further provide for routing any of the incoming channels to an further external connector, for processing by a channel processor separate from the chassis.

The invention yet further provides a network monitoring system wherein a first group of multi-channel network monitoring apparatuses according to the fourth aspect of the invention as set forth above are connected to receive a plurality of incoming signals, wherein the switching unit of each apparatus in the first group provides for routing any of its incoming channels to a further external connector, the system further comprising at least one further multi-channel network monitoring apparatus according to the fourth aspect of the invention as set forth above, connected to receive incoming channels from said further external connectors of the first group of apparatuses, the further apparatus thereby providing back-up in the event of a channel processor failure or replacement within the first group of apparatuses.

The invention yet further provides a network monitoring system wherein a plurality of multi-channel network monitoring apparatuses according to the fourth aspect of the invention as set forth above are connected to a larger plurality of incoming channels via multiplexing means, the total number of channel processors within the monitoring apparatuses being greater than the number of incoming channels at any given time, such that any incoming channel can be routed by the multiplexing means and appropriate switching unit to an idle channel processor of one of the monitoring apparatuses. This allows the system to continue monitoring all channels in the event of failure or replacement of any channel processor.

The number of channel processors may be greater than the number of incoming channels by at least the number of channel processors in each monitoring apparatus. This allows the system to continue monitoring all channels in the event of failure or replacement of one complete apparatus.

The multiplexing means may be formed by optical switches, while the switching units within each monitoring apparatus operate on signals after conversion to electrical form.

Alternatively, the multiplexing means may include electronic switches, while inputs and outputs are converted to-and-from optical form for ease of interconnection between separate enclosures. In principle, the conversion from optical to electrical for could happen at any point, from the network tap point to the processing module itself.

The above systems will typically further comprise one or more multi-channel optical power splitters, for tapping into active optical communications bearers to obtain the said incoming signals for the monitoring apparatuses. The redundancy and adaptability within the monitoring system reduces the need for multiple monitoring taps, preserving the integrity of the network.

In a fifth aspect the invention provides a multi-channel replicating device for broadband optical signals, the device comprising one or more modules having:

a first plurality of input connectors for receiving broadband optical signals;

a larger plurality of output connectors for broadband optical signals;

means for replicating each received broadband optical signal to a plurality of said output connectors without digital processing.

Such a device allows multiple monitoring applications to be performed on a network signal with only one optical tap being inserted in the physical bearer or the operating network. Redundancy in the monitoring equipment can be provided, also with the single bearer tap. Change in the configuration of the monitoring equipment can be implemented without disturbing the bearer operation, or even the other monitoring applications.

The replicating means may in particular involve components for optical to electrical conversion and back to optical again.

The replicating device may further comprise an one or more additional optical outputs, and a selector devices for selecting which of the input signals is replicated at said additional output. This selection can be useful in particular in response to fault situations and planned outages within the network monitoring equipment.

The invention in the fifth aspect further provides a telecommunications network monitoring system comprising:

an optical splitting device, providing a tap signal for monitoring signals carried by a bearer in a broadband telecommunications network;

a plurality of network monitoring units, each for receiving and analysing signals from a broadband optical bearer; and a signal replicating device according to the fifth aspect of the invention as set forth above, the signal replicating device being connected so as to receive said optical tap signal, and to provide replicas of said optical tap signal to inputs of two or more of said network monitoring units.

BRIEF DESCRIPTION OF THE DRAWINGS

Embodiments of the invention will now be described, by way of example only, with reference to the accompanying drawings, in which:

FIG. 15B is a front view of the chassis and backplane of FIG. 15A with all modules removed, showing the general layout of connectors and interconnections in the backplane.

FIG. 15C is a rear view of the chassis and backplane of FIG. 15A with all modules removed, showing the general layout of connectors and interconnections in the backplane, and showing in cut-away form the location of a power supply module.

DETAILED DESCRIPTION OF THE EMBODIMENTS

Background

Figure 1:
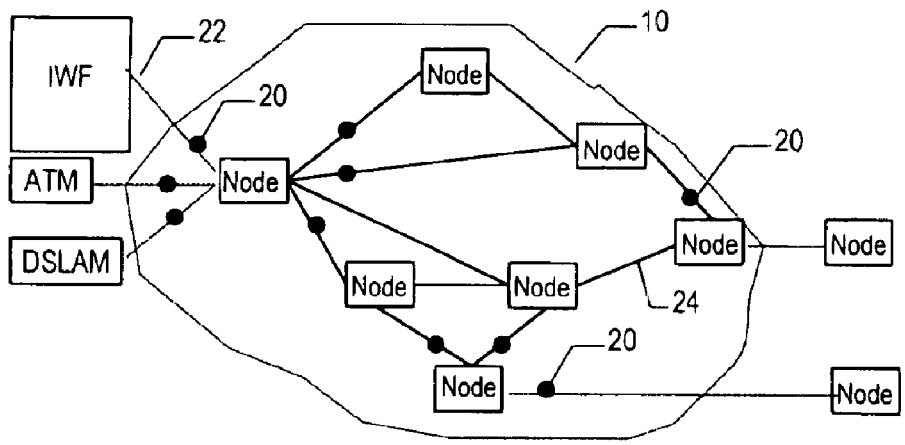
FIG. 1 shows a model of a typical ATM network.

FIG. 1 shows a model of a telecommunication network 10 based on asynchronous transfer mode (ATM) bearers. Possible monitoring points on various bearers in the network are shown at 20 and elsewhere. Each bearer is generally an optical fibre carrying packetised data with both routing information and data "payload" travelling in the same data stream. Here "bearer" is used to mean the physical media that carries the data and is distinct from a "link", which in this context is defined to mean a logical stream of data. Many links of data may be multiplexed onto a single bearer. These definitions are provided for consistency in the present description, however, and should not be taken to imply any limitation of the applicability of the techniques disclosed, or on the scope of the invention defined in the appended claims. Those skilled in the art will sometimes use the term "channel" to refer to a link (as defined), or "channel" may be used to refer to one of a number of virtual channels being carried over one link, which comprises the logical connection between two subscribers, or between a subscriber and a service provider. Note that such "channels" within the larger telecommunications network should not be confused with the monitoring channels within the network probe apparatus of the embodiments to be described hereinafter.

The payload may comprise voice traffic and/or other data. Different protocols may be catered for, with examples showing connections to Free Relay Gateway, ATM and DSLAM equipment being illustrated. User-Network traffic 22 and Network—Network traffic 24 are shown here as dashed lines and solid lines respectively.

Figure 2:
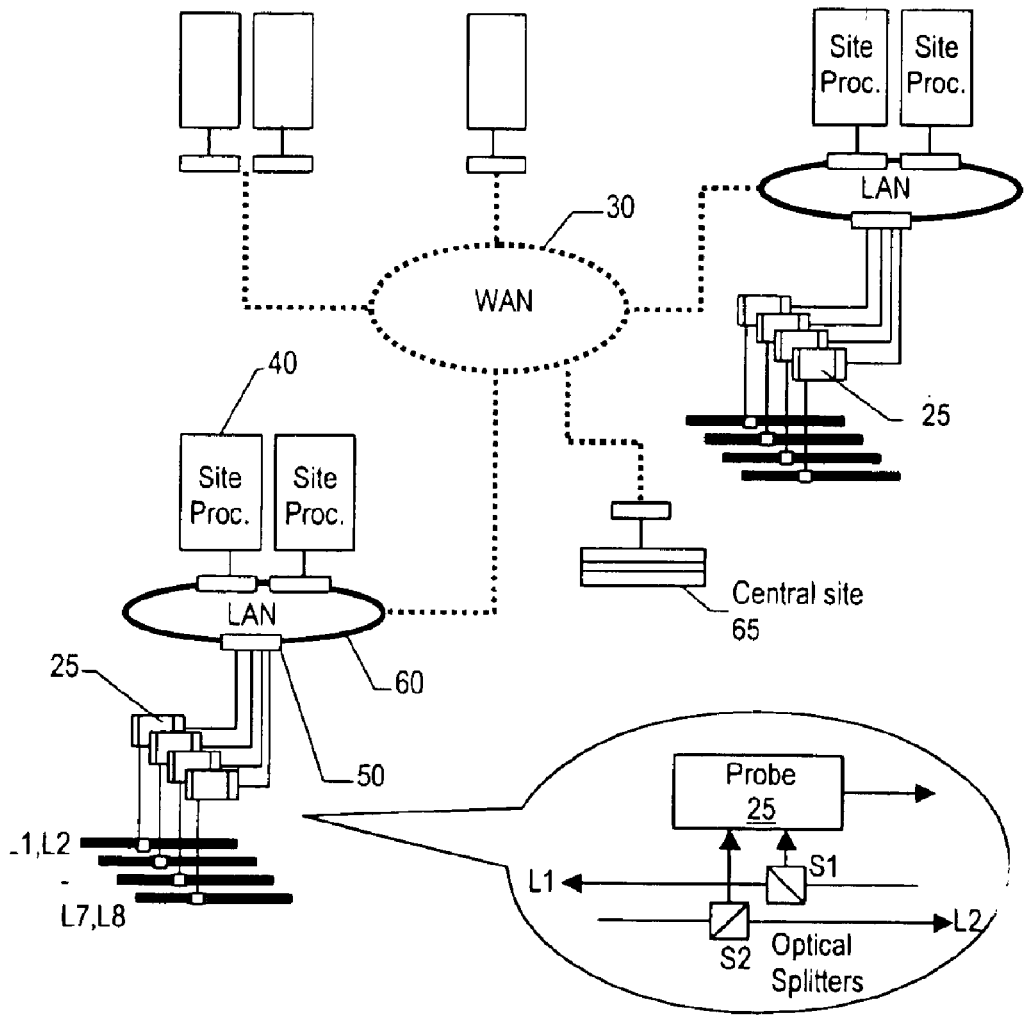
FIG. 2 shows a data collection and packet processing apparatus connected to a physical telecommunications network via a LAN/WAN interconnect.

In FIG. 2 various elements 25–60 of a data collection and packet processing system distributed at different sites are provided for monitoring bearers L1–L8 etc. of a telecommunications network. The bearers in the examples herein operate in pairs L1, L2 etc. for bi-directional traffic, but this is not universal, nor is it essential to the invention. Each pair is conveniently monitored by a separate probe unit 25, by means of optical splitters S1, S2 etc. inserted in the physical bearers. For example, one probe unit 25, which monitors bearers L1 and L2, is connected to a local area network (LAN) 60, along with other units at the same site. The probe unit 25 on an ATM/IP network must examine a vast quantity of data, and can be programmed to filter the data by a Virtual Channel (VC) as a means of reducing the onboard processing load. Filtering by IP address can be used to the same effect in the case of IP over SDH and other such optical networks. Similar techniques can be used for other protocols. Site processors 40 collate and aggregate the large quantity of information gathered by the probe units, and pass the results via a Wide Area Network (WAN) 30 to a central site 65. Here this information may be used for network planning and operations. It may alternatively be used for billing according to the volume of monitored traffic per subscriber or service provider or other applications.

The term "probe unit" is used herein refer to a functionally self-contained sub-system designed to carry out the required analysis for a bearer, or for a pair or larger group of bearers. Each probe unit may include separate modules to carry out such operations as filtering the packets of interest and then interpreting the actual packet or other data analysis.

In accordance with current trends, it is assumed in this description that the links to be monitored carry Internet Protocol (IP) traffic over passive optical networks (PONS) comprising optical fibre bearers. Connection to such a network can only really be achieved through use of passive optical splitters S1, S2 etc. Passive splitters have advantages such as high reliability, comparatively small dimensions, various connection configurations and the fact that no power or element management resources required. An optical splitter in such a situation works by paring off a percentage of the optical power in a bearer to a test port, the percentage being variable according to hardware specifications.

A number of issues are raised when insertion of such a device is considered. For example, there should be sufficient bearer receiver power margins remaining at both test device and the through port to the rest of the network. It becomes necessary to consider what is the most economic method of monitoring the bearer in the presence of a reduced test port power budget while limiting the optical power needed by the monitoring probe and if the network would have to be re-configured as a result of inserting the device.

Consequently, inserting a power splitter to monitor a network frequently requires an increase in launch power. This entails upgrading the transmit laser assembly and installing an optical attenuator where needed to reduce optical power into the through path to normal levels. Such an upgrade would ideally only be performed once.

For these reasons it is not desirable to probe, for example, an ATM network more than once on any given bearer. Nevertheless, it would be desirable to have the ability for multiple probing devices to be connected to the same bearer, that is, have multiple outputs from the optical interface. The different probes may be monitoring different parameters. In addition, however, any network monitoring system must offer a high degree of availability, and multiple probes are desirable in the interests of redundancy. The probe apparatuses and ancillary equipment described below allow the implementation of such a network monitoring system which can be maintained and expanded with simple procedures, with minimal disruption to the network itself and to the monitoring applications.

Network Probe System—General Architecture

Figure 3:
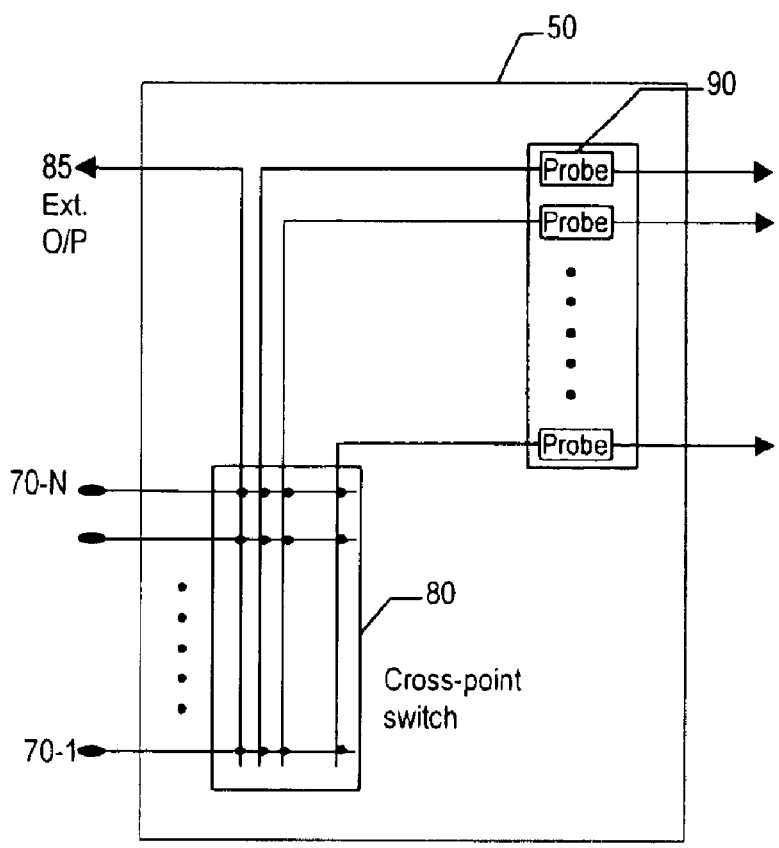
FIG. 3 shows the basic functional architecture of a novel network probe apparatus, as featured in FIG. 2.

FIG. 3 shows the basic functional architecture of a multi-channel optical fibre telecommunications probe apparatus 50 combining several individual probe units, into a more flexible system than has hitherto been available. The network monitoring apparatus shown receives N bearer signals 70 such as may be available from N optical fibre splitters. These enter a cross-point switch 80 capable of routing each signal to any of M individual and independently-replaceable probe units 90. Each probe unit corresponds in functionality broadly with the unit 25 shown in FIG. 2. An additional external output 85 from the cross-point switch 80 is routed to an external connector. This brings important benefits, as will described below.

The cross-point switch 80 and interconnections shown in FIG. 3 may be implemented using different technologies, for example using passive optical or optoelectronic cross-points. High speed networks, for example OC48, require electrical path lengths as short as possible. An optical switch would therefore be desirable, deferring as much as possible the conversion to electrical. However, the optical switching technology is not yet fully mature. Therefore the present proposal is to have an electrical implementation for the cross-point switch 80, the signals converted from optical to electrical at the point of entry into the probe apparatus 50. The scale of an optoelectronic installation will be limited by the complexities of the cross-point switch and size of the probe unit. The choice of interconnect technology (for example between electrical and optical), is generally dependent on signal bandwidth-distance product. For example, in the case of high bandwidth/speed standards such as OC3, OC12, or OC48, inter-rack connections may be best implemented using optical technology.

Detailed implementation of the probe apparatus in a specific embodiment will be described in more detail with reference to FIGS. 14 to 19. As part of this, a novel chassis arrangement for multi-channel processing products is described, with reference to FIGS. 15A–15C, which may find application in fields beyond telecommunications monitoring. First, however, applications of the multi-channel probe architecture will be described, with reference to FIGS. 4 to 13.

Figures 4, 5:
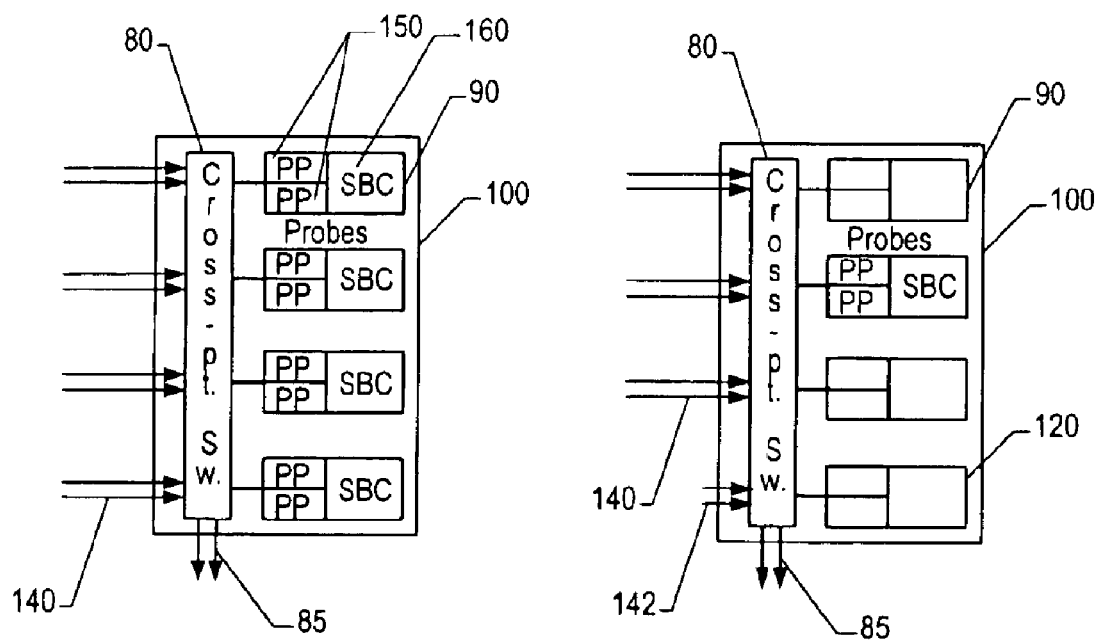
FIG. 4 shows a simple network monitoring system which can be implemented using the apparatus of the type shown in FIG. 3.
FIG. 5 shows another application of the apparatus of FIG. 4 giving 3+1 redundancy.

FIG. 4 shows a simple monitoring application which can be implemented using the apparatus of the type shown in FIG. 3. The cross-point switch 80 is integrated into the probe chassis 100 together with up to four independently operating probe units. In this implementation of the architecture each probe unit (90 in FIG. 3) is formed by a packet processor module 150 and single board computer SBC 160 as previously described. There are provided two packet processors 150 in each probe unit 90. Each packet processor can receive and process the signal of one half-duplex bearer. SBC 160 in each probe unit has the capacity to analyse and report the data collected by the two packet processors. Other modules included in the chassis provide LAN interconnections for onward reporting of results, probe management, power supply, and cooling modules (not shown in FIGS. 4 to 13B).

In this application example a single, fully loaded chassis 100 is used with no redundancy to monitor eight single (four duplex) bearers connected at 140 to the external optical inputs of the apparatus (inputs 70-1 to 70-N in FIG. 3). The cross-point switch external outputs 85 are shown but not used in this configuration. Applications of these outputs are explained for example in the description of FIGS. 6, 8, 10 and 12 below.

FIG. 5 shows an alternative application of the apparatus giving 3+1 redundancy. Here three duplex bearer signals are applied to external inputs 140 of the probe apparatus chassis 100, while the fourth pair of inputs 142 is unused. Within the chassis there are thus three primary probe units 90 plus a fourth, spare probe unit 120. The cross-point switch 80 can be used to switch any of the other bearers to this spare probe unit in the event of a failure in another probe unit. Already by integrating the cross-point switch and several probe units in a single chassis, a scaleable packet processor redundancy down to 1:1 is achieved without the overhead associated with an external cross-point switch. Since electrical failures cause only a very minor proportion of outages, redundancy within the chassis is valuable, with the added bonus that complex wiring outside the chassis may be avoided. One or more processors within each chassis can be spare at a given time, and switched instantaneously and/or remotely if one of the other probe units becomes inoperative.

Figure 6:
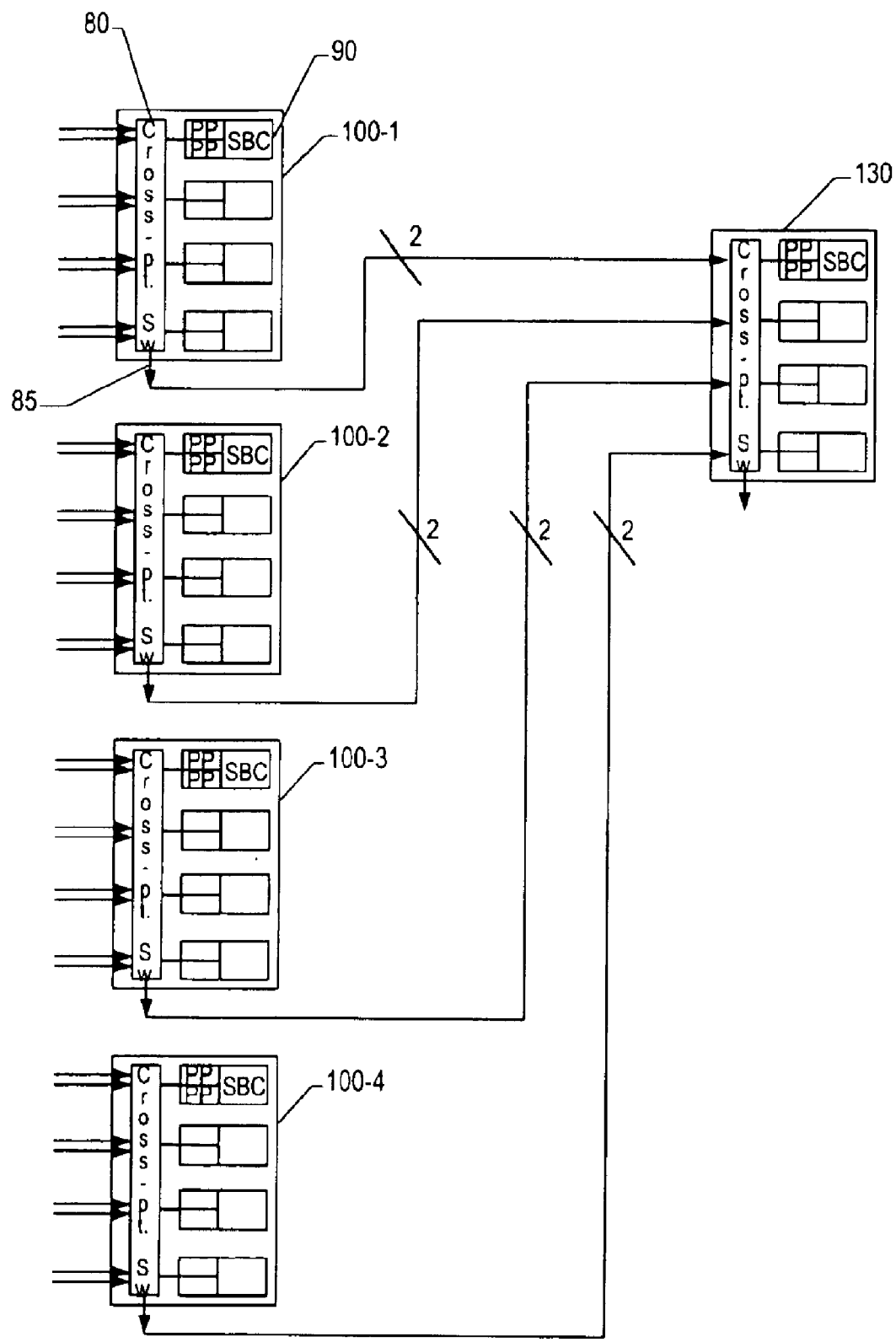
FIG. 6 shows a larger redundant network monitoring system including a backup apparatus.

FIG. 6 shows a larger redundant system comprising four primary probe apparatuses (chassis 100-1 to 100-4), and a backup chassis 130 which operates in the event of a failure in one of the primary chassis. In this example of a large redundant system there are 16 duplex bearers being monitored. Each external input pair of the backup chassis is connected to receive a duplex bearer signal from the external optical output 85 of a respective one of the primary apparatuses 100-1 to 100-4. By this arrangement, in the event of a single probe unit failure in one of the primary apparatuses, a spare probe unit within the backup chassis can take over the out-of-service unit's function. Assuming all inputs and all of the primary probe units are operational in normal circumstances, we may say that 4:1 redundancy is provided.

Recognising that in this embodiment only one optical interface is connected to the bearer under test, the chassis containing the optical interfaces can if desired have redundant communications and/or power supply units (PSUs) and adopt a "hot swap" strategy to permit rapid replacement of any hardware failures. "Hot swap" in this context means the facility to unplug one module of a probe unit within the apparatus and replace it with another without interrupting the operation or functionality of the other probe units. Higher levels of protection can be provided on top of this, if desired, as described below with reference to FIGS. 15A–C and 16.

Figure 7:
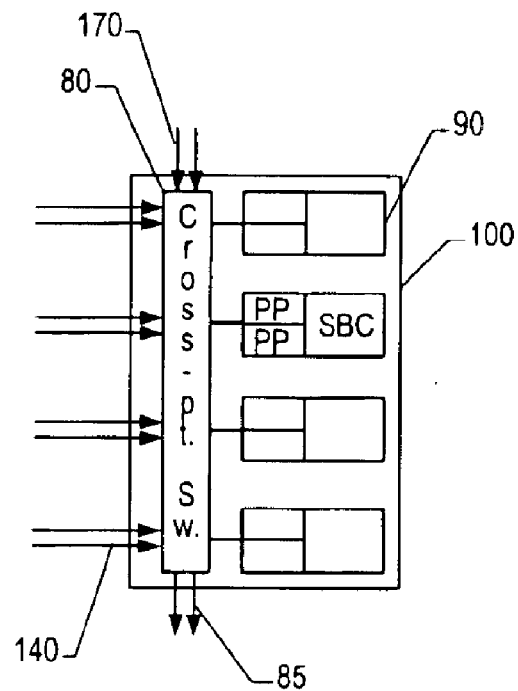
FIG. 7 shows an example of a modified probe apparatus permitting a "daisy chain" configuration to provide extra redundancy and/or processing power.

FIG. 7 shows a modified probe apparatus which provides an additional optical input 170 to the cross-point switch 80. In other words, the cross-point switch 80 has inputs for more bearer signals than can be monitored by the probe units within its chassis. At the same time, with the external optical outputs 85, the cross-point switch 80 outputs for more signals than can be monitored by the probe units within the chassis. These additional inputs 170 and outputs 85 can be used to connect a number of probe chassis together in a "daisy chain", to provide extra redundancy and/or processing power. By default, in the present embodiment, copies of the bearer signals received at daisy chain inputs 170 are routed to the external outputs 85. Any other routing can be commanded, however, either from within the apparatus or from outside via the LAN (not shown).

Figure 8:
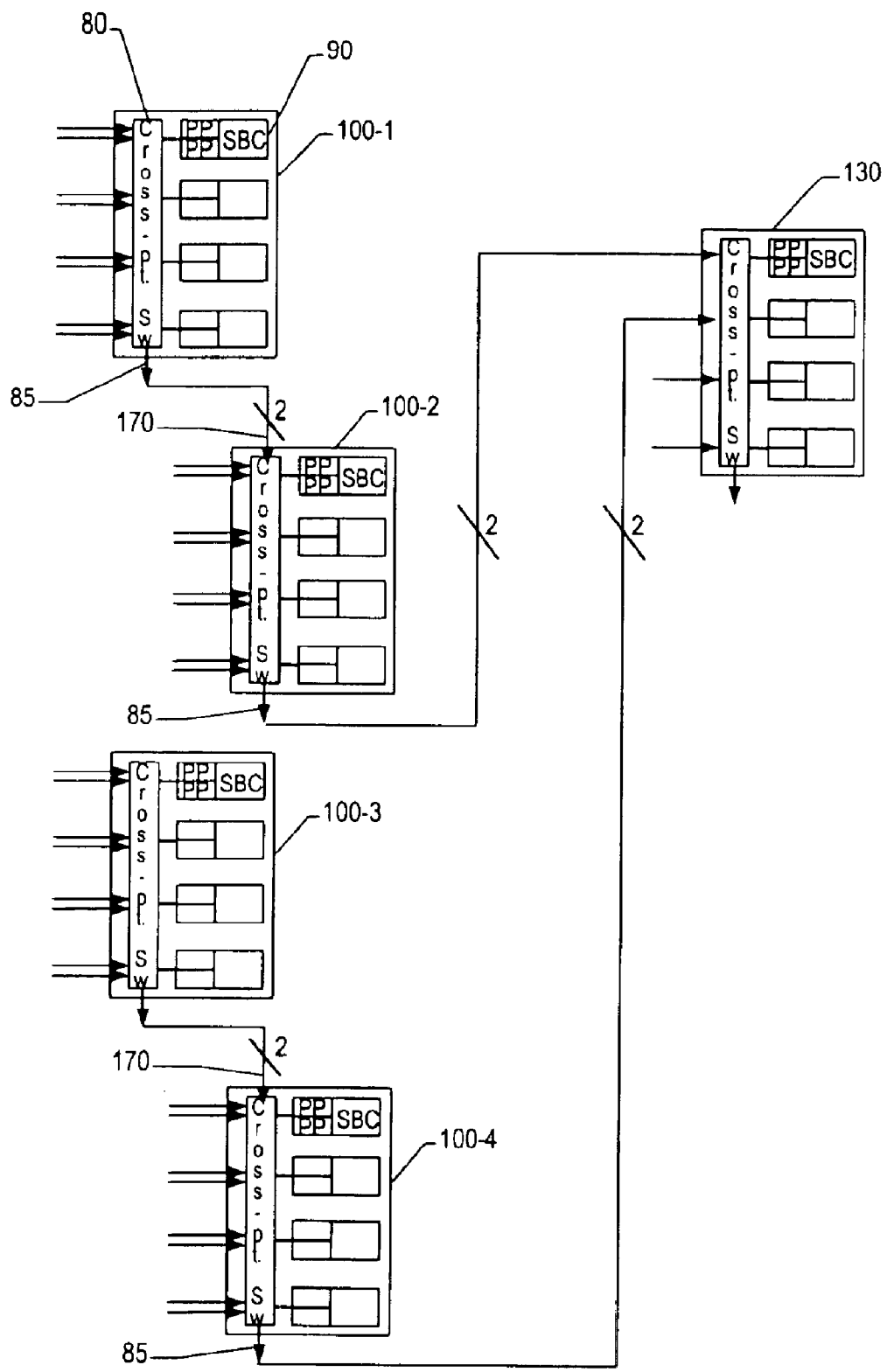
FIG. 8 shows an example of daisy chaining the probe chassis of FIG. 7 giving 8+1 redundancy.

FIG. 8 shows an example of daisy chaining the probe chassis to give 8:1 redundancy.

The four primary probe chassis 100-1 to 100-4 are connected in pairs (100-1 & 100-2 and 100-3 & 100-4). The external outputs 85 on the first chassis of each pair are connected to the daisy chain inputs 170 on the second chassis. The external outputs 85 of the second chassis are connected to input of a spare of backup chassis 130 as before. These connections can carry the signal through to the spare chassis when there has been a failure in a probe unit in either the first or second chassis in each pair. Unlike the arrangement of FIG. 6, however, it will be seen that the backup chassis 130 still has two spare pairs of external inputs. Accordingly, the system could be extended to accommodate a further four chassis (up to sixteen further probe units, and up to thirty-two further bearer signals), with the single backup chassis 130 providing some redundancy for all of them.

For applications that involve processor intensive tasks it may be desirable to increase the processing power available to monitor each bearer. This may be achieved by various different configurations, and the degree of redundancy can be varied at the same time to suit each application.

Figure 9:
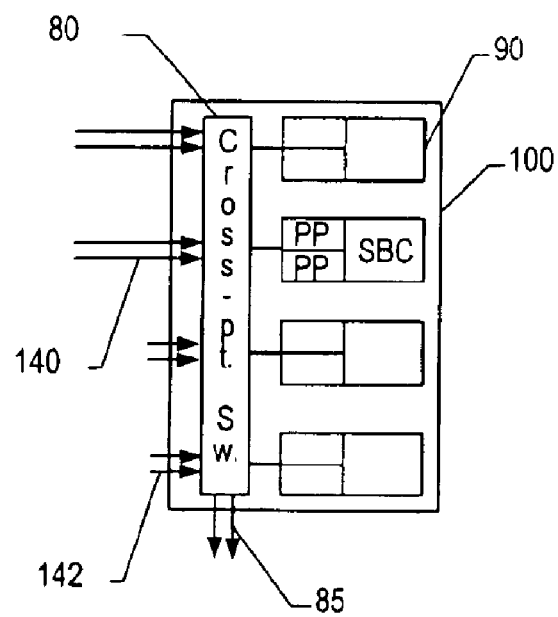
FIG. 9 shows a further application of the probe apparatus giving added processing power per bearer.

FIG. 9 illustrates how it is possible to increase the processing power available for any given bearer by reconfiguring the probe units. In this configuration only two duplex bearer signals 140 are connected to the chassis 100. Two inputs 142 are unused. Within the cross-point switch 80 each bearer signal is duplicated and routed to two probe units 90. This doubles the processing power available for each of the bearers 140. This may be for different applications (for example routine billing and fraud detection), or for more complex analysis on the same application. Each packet processor (150, FIG. 4) and SBC (160) will be programmed according to the application desired. In particular, each packet processor, while receiving and processing all the data carried by an associated bearer, will be programmed to filter the data and to pass on only those packets, cells, or header information which is needed by the SBC for a particular monitoring task. The ability to provide redundancy via the external outputs 85 still remains.

Figure 10:
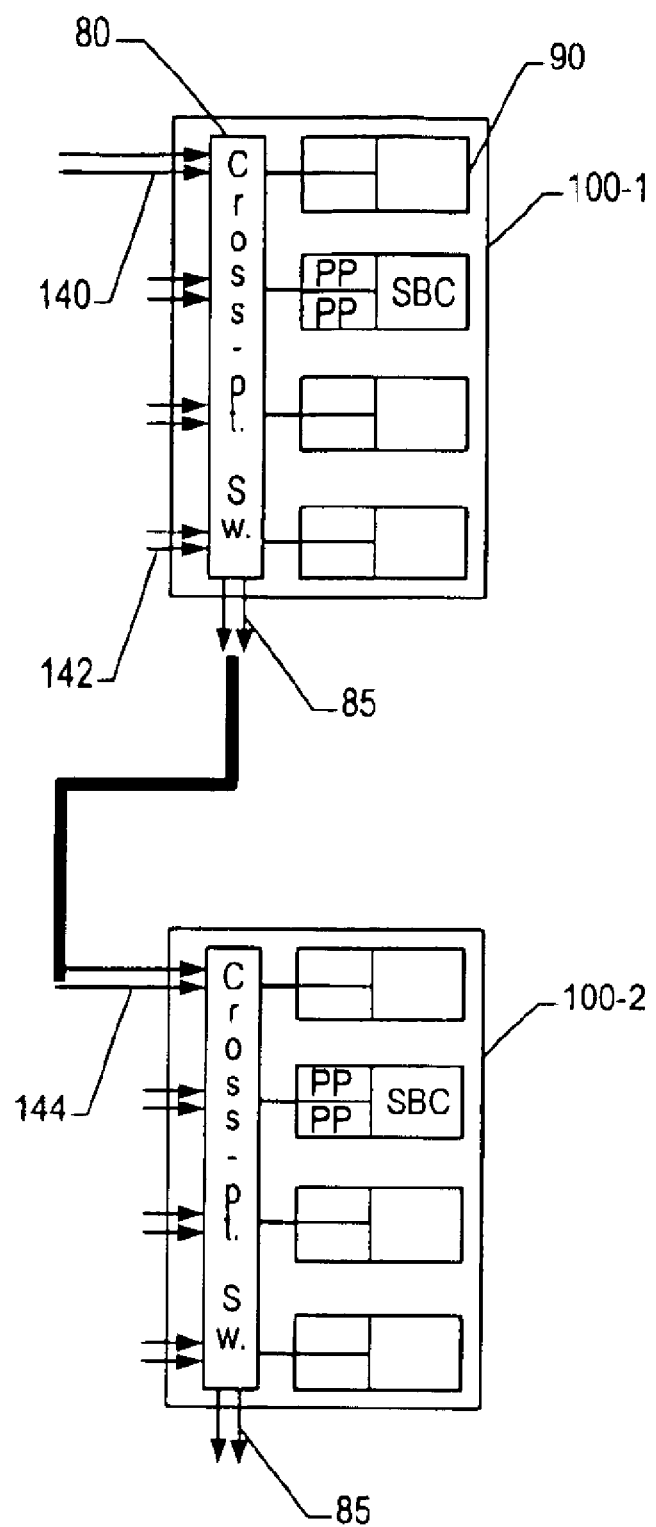
FIG. 10 shows a second means of increasing processing power by linking more than one chassis together.

FIG. 10 illustrates a second method of increasing processing power is by connecting more than one chassis together in a daisy chain or similar arrangement. Concerning the "daisy chain" inputs, FIG. 10 also illustrates how a similar effect can be achieved using the unmodified apparatus (FIG. 3), providing the apparatus is not monitoring its full complement of bearer signals. The external inputs can thus be connected to the external outputs 85 of the previous chassis, instead of using special inputs 170 as shown in FIGS. 7 and 8.

In the configuration of FIG. 10, two chassis 100-1 and 100-2 are fully loaded with four probe units 90 each. External signals for all eight probe units are received at 140 from a single duplex bearer. The cross-point switch 80 is used to replicate these signals to every probe unit 90 within the chassis 100-1, and also to the external outputs 85 of the first chassis 100-1. These outputs in turn are connected to one pair of inputs 144 of the second chassis 100-2. Within the second chassis, the same signals are replicated again and applied to all four probe units, and (optionally) to the external outputs 85 of the second chassis 100-2.

Thus, all eight probe units are able to apply their processing power to the same pair of signals, without tapping into the bearer more than once. By adding further chassis in such a daisy chain, processing power is scaleable practically to as much processing power as needed.

The examples given are for way of illustration only, showing how using the chassis architecture described it is possible to provide the user with the processing power needed and the redundancy to maintain operation of the of the system in the event of faults and planned outages. It will be appreciated that there are numerous different configurations possible, besides those described.

For example, it is also possible to envisage a bi-directional daisy chain arrangement. Here, one output 85 of a first chassis might be connected to one input 170 of a second chassis, while the other output 85 is connected to an input 170 of a third chassis. This arrangement can be repeated if desired to form a bi-directional ring of apparatuses, forming a kind of "optical bus".

The probe apparatus described above allow the system designer to achieve N+1 redundancy by using the cross-point switch 80 to internally re-route a bearer to a spare processor, or to another chassis. On the other hand, it will be recognised that some types of failure (e.g. in the chassis power supply) will disrupt operation of all of the processors in the chassis. It is possible to reduce such a risk by providing N+1 PSU redundancy, as will be/has been described.

Broadband Bridging Isolator

Figure 11:
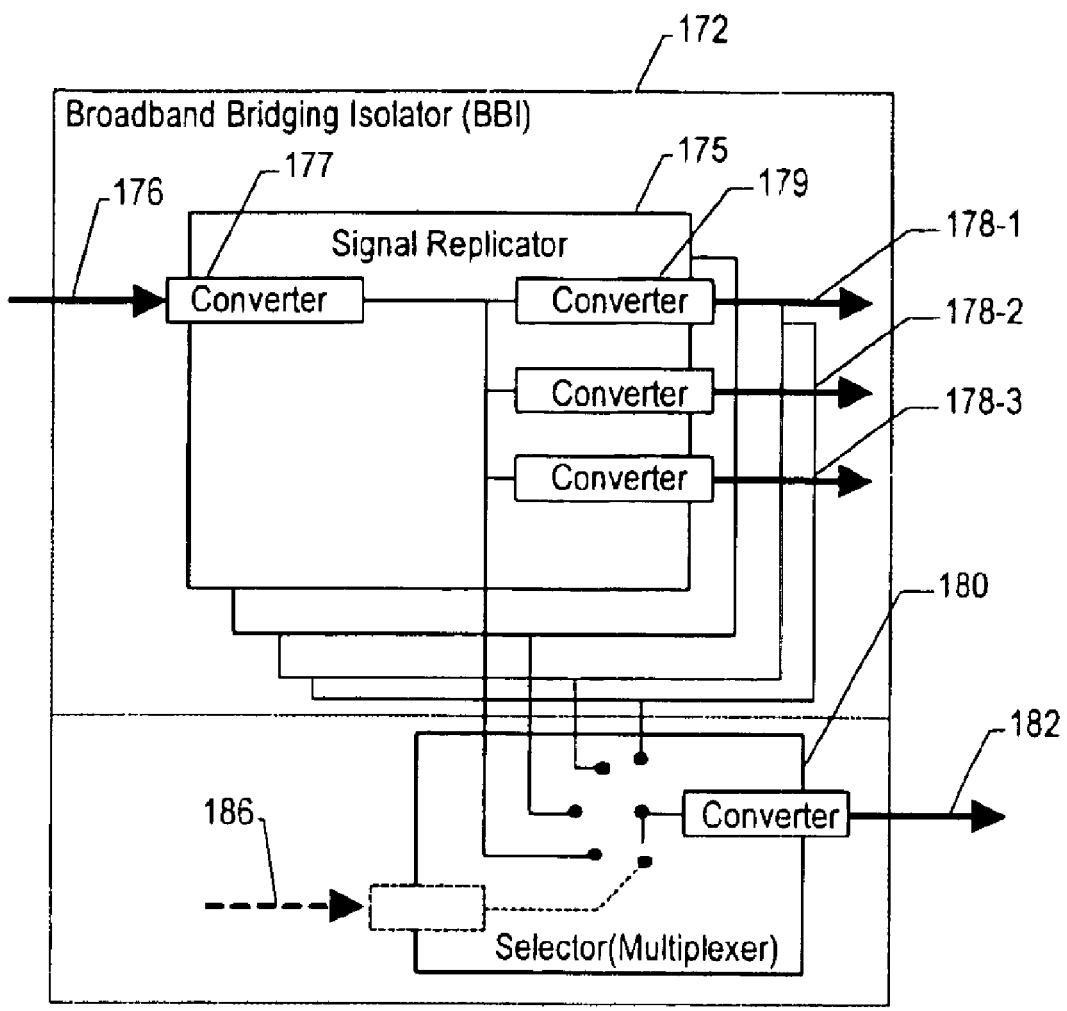
FIG. 11 shows a signal replicating device (referred to as a Broadband Bridging Isolator (BBI)) for use in a network monitoring system.

FIG. 11 shows an optional signal replicating device for use in conjunction with the probe apparatus described above, or other monitoring apparatus. This device will be referred to as a Broadband Bridging Isolator (BBI). Broadband Bridging Isolator can be scaled to different capacities, and to provide additional fault tolerance independently of the probe apparatuses described above. The basic unit comprises a signal replicator175. For each unit, an (optical) input 176 is converted at 177 to an electrical signal, which is then replicated and converted at 179 etc. to produce a number of identical optical output signals at outputs 178-1 etc.

Also provided within BBI 172 are one or more standby selectors (multiplexers) 180 (one only shown). Each selector 180 receives replicas of the input signals and can select from these a desired one to be replicated at a selector optical output 182. An additional input 186 (shown in broken lines) may be provided which passes to the selector 180 without being replicated, to permit "daisy chain" connection.

In use, BBI 172 takes a single tap input 176 from a bearer being monitored and distributes this to multiple monitoring devices, for example probe apparatuses of the type shown in FIGS. 3 to 10. For reliability, the standby selector 180 allows any of the input signals to be switched to a standby chassis.

The number of outputs that are duplicated from each input is not critical. A typical implementation may provide four, eight or sixteen replicators 175 in a relatively small rack mountable chassis, each having (for example) four outputs per input. Although the concepts here are described in terms of optical bearers, the same concepts could be applied to high speed electrical bearers (e.g. E3, DS3 and STM1e).

The reasons for distributing the signal could be for multiple applications, duplication for reliability, load sharing or a combination of all three. It is important that only one tap need be made in the operational bearer. As described in the introductory part of this specification, each optical tap reduces the strength of the optical signal reaching the receiver. In marginal conditions, adding a tap may require boosting the signal on the operational bearer. Network operators do not want to disrupt their operational networks unless they have to. The BBI allows different monitoring apparatuses for different applications to be connected, and removed and re-configured without affecting the operational bearer, hence the name "isolator". The BBI can even be used to re-generate this signal by feeding one of the outputs back into the network, so that the BBI becomes part of the operational network.

The number of bearer signals that are switched through the standby selector 180 will depend on the users requirements—this number corresponds effectively to "N" in the phrase "N+1 redundancy". The number of standby selectors in each BBI is not critical. Adding more means that more bearers can be switched should there be a failure.

The BBI must have high reliability as when operational in a monitoring environment it an essential component in the monitoring of data, providing the only bridging link between the signal bearers and the probe chassis. No digital processing of the bearer signal is performed in the BBI, which can thus be made entirely of the simplest and most reliable optoelectronic components. When technology permits, in terms of cost and reliability, there may be an "all-optical" solution, which avoids conversion to electrical form and back to optical. Presently, however, the state of the art favours the optoelectronic solution detailed here. The BBI can be powered from a redundant power supply to ensure continuous operation. The number of bearers handled on a single card can be kept small so that in event of a failure the number of bearers impacted is small. The control of the standby switch can be by an external control processor.

Figure 12:
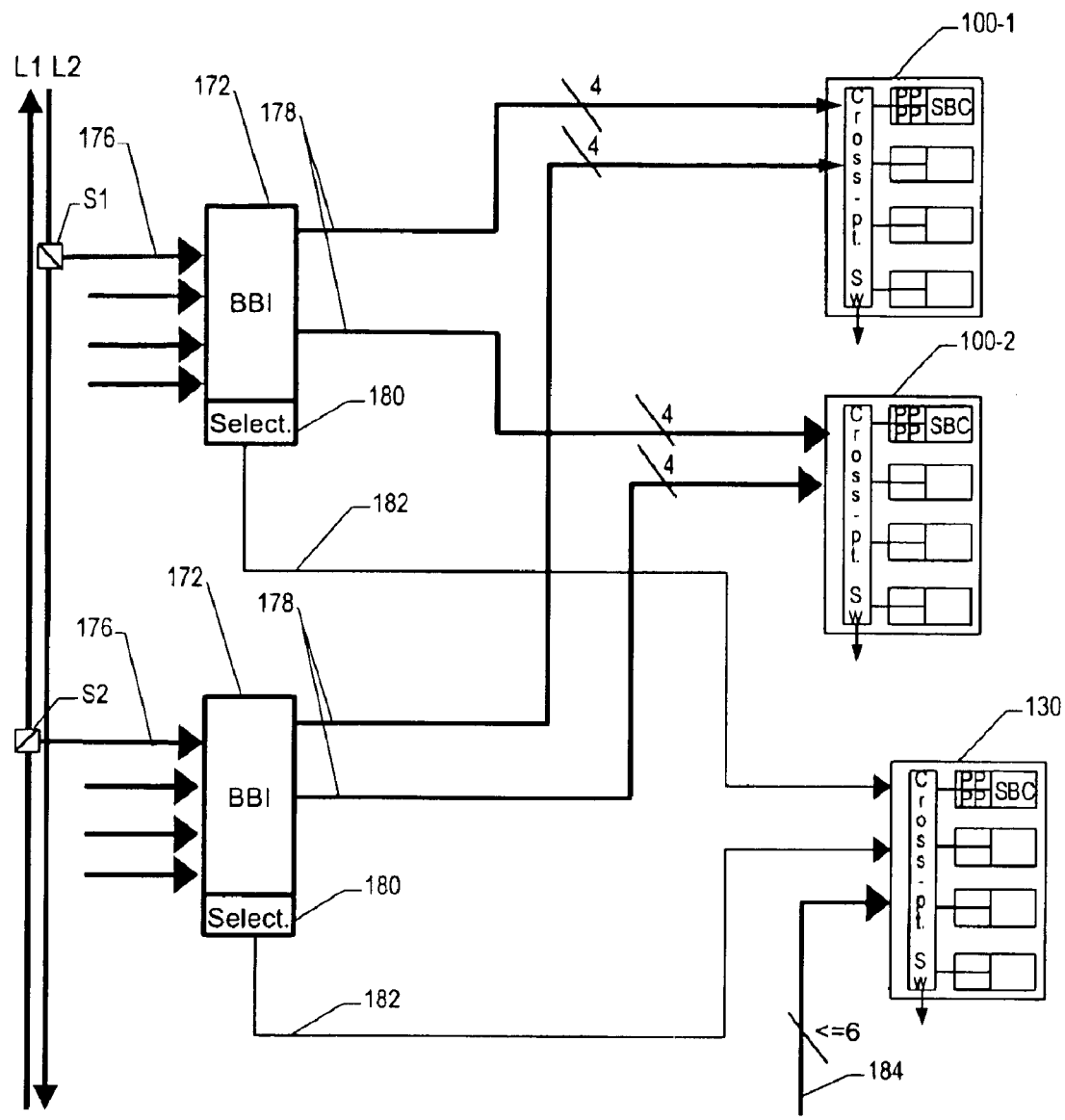
FIG. 12 shows a typical configuration of a network monitoring system using the BBI of FIG. 11 and several probe apparatuses.

FIG. 12 shows a system configuration using BBIs and two separate probe chassis 100-1 and 100-2 implementing separate monitoring applications. The two application chassis may be operated by different departments within the network operators organisation. A third, spare probe chassis 130 is shared in a standby mode. This example uses two BBIs 172 to monitor a duplex bearer pair shown at L1, L2, and other bearers not shown. Splitters S1 and S2 respectively provide tap input signals from L1, L2 to the inputs 176 of the separate BBIs. Each BBI duplicates the signal at its input 176 to two outputs 178, and the manner described above with reference to FIG. 11. For improved fault tolerance, the two four-way BBIs 172 are used to half duplex bearers L1 and L2 separately. In other words, the two halves of the same duplex bearer are handled by different BBIs. Three further duplex bearers (L3–L8, say, not shown in the drawing), are connected to the remaining inputs of the BBIs 172 in a similar fashion.

Using the standby selector 180 any one of the bearers can be switched through to the standby chassis 130 in the event of a failure of a probe unit in one of the main probe chassis 100-1, 100-2. It will be appreciated that, if there is a failure of a complete probe chassis, then only one of the bearers can be switched through to the standby probe. In a larger system with, say, 16 duplex bearers, four main probe chassis and two standby chassis, the bearers distributed by each BBI can be shared around the probe chassis so that each probe chassis processes one bearer from each BBI. Then all four bearers can be switched to the standby probe in the event of a complete chassis failure.

It will be seen that the BBI offers increased resilience for users particularly when they have multiple departments wanting to look at the same bearers. The size of the BBI used is not critical and practical considerations will influence the number of inputs and outputs. For example, the BBI could provide inputs for 16 duplex bearers, each being distributed to two or three outputs with four standby outputs. Where multiple standby circuits are used each will be capable of being independently switched to any of the inputs.

Figure 13A:
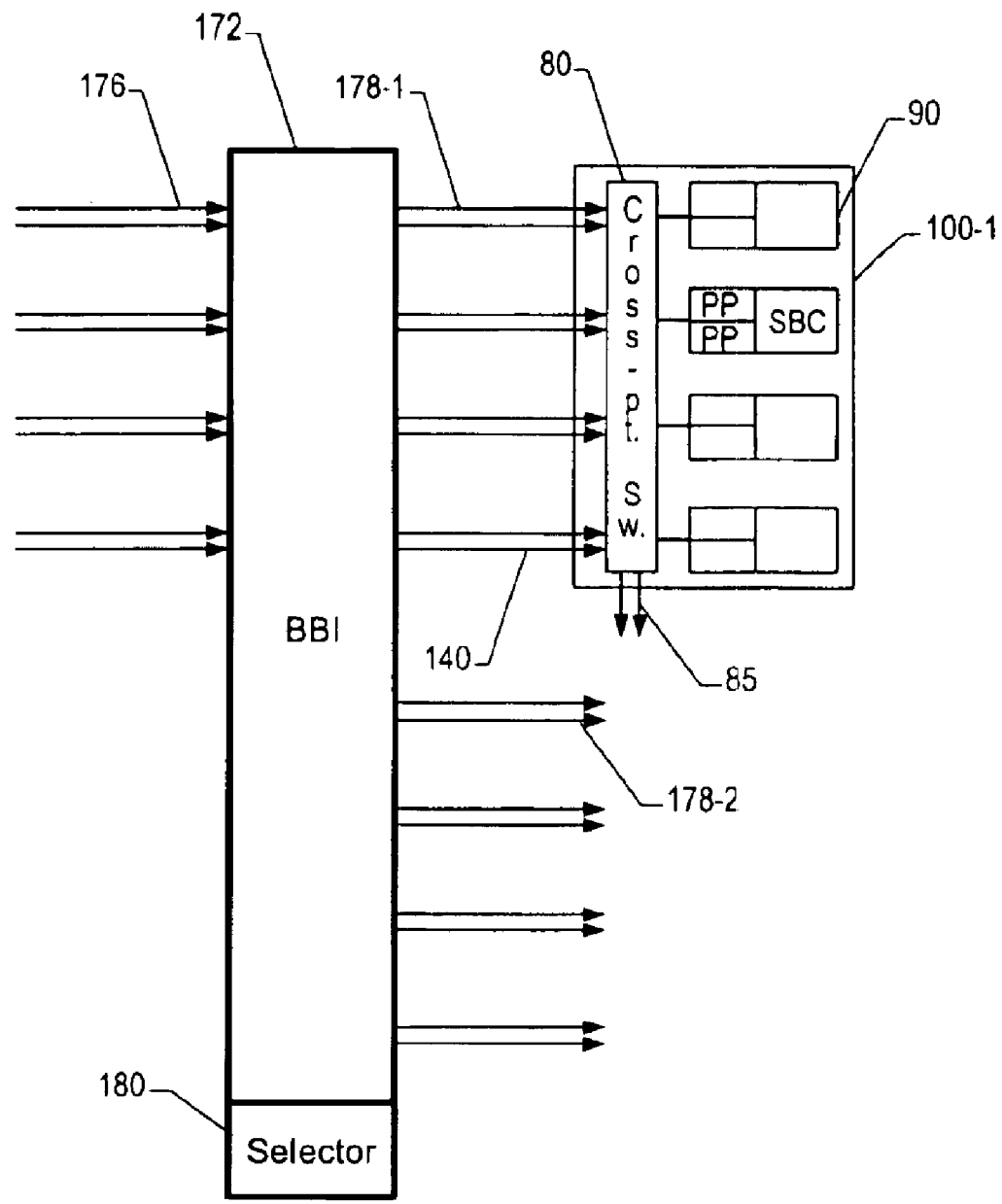
FIGS. 13A and 13B illustrate a process of upgrading the processing power of a network monitoring system without interrupting operation.
Figure 13B:
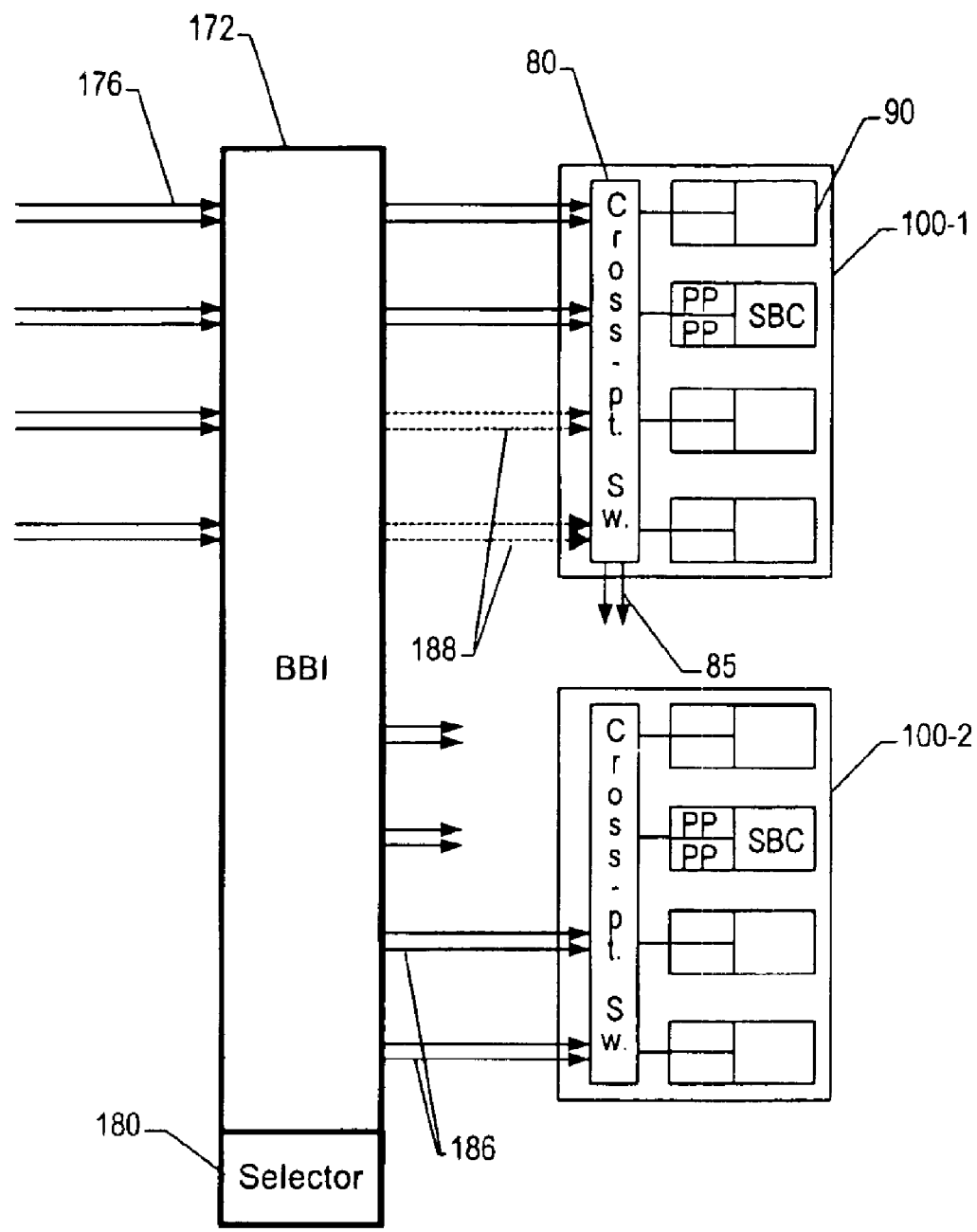

FIGS. 13A and 13B illustrate a process of upgrading the processing power of a network monitoring system without interrupting operation, using the facilities of the replicating devices (BBIs 172) and probe chassis described above. FIG. 13A shows an example of an "existing" system with one probe chassis 100-1. Four duplex bearer signals are applied to inputs 140 of the chassis. Via the internal cross-point switch 80, each bearer signal is routed to one probe unit 90. With a view to further upgrades and fault tolerance, a broadband bridging isolator (BBI). Each bearer signal is received from a tap in the actual bearer (not shown) at a BBI input 176. The same bearer signal is replicated at BBI outputs 178-1, 178-2 etc. The first set of outputs 178-1 are connected to the inputs 140 of the probe chassis. The second set of outputs 178-2 are not used in the initial configuration.

FIG. 13B shows the an expanded system, which includes a second probe chassis 100-2 also loaded with four probe units 90. Consequently there are now provided two probe units per bearer, increasing the processing power available per bearer. It is a simple task to migrate from the original configuration in FIG. 13A to the new one shown in FIG. 13B:

Step 1 —Install the extra chassis 100-2 with the probe units, establishing the appropriate power supply and LAN communications.

Step 2—Connect two of the duplicate BBI outputs 186 to inputs of the extra chassis 100-2. (All four could be connected for redundancy if desired.)

Step 3—Configure the new chassis 100-2 and probe units to monitor the two bearer signals in accordance with the desired applications.

Step 4—Re-configure the original chassis to cease monitoring the corresponding two bearer signals of the first set of outputs 178-1 (188 in FIG. 13B). (The processing capacity freed in the original chassis 100-1 can then be assigned expanded monitoring of the two duplex bearer signals which remain connected to the BBI outputs 178-1.)

Step 5—Remove the connections 188 no longer being used. (These connections could be left for redundancy if desired.)

In this example the processing power has been doubled from one probe unit per bearer to two probe units per bearer but it can be seen that such a scheme could be easily extended by connecting further chassis. At no point has the original monitoring capacity been lost, and at no point have the bearers themselves (not shown) been disrupted. Thus, for example, a module of one probe unit can be removed for upgrade while other units continue their own operations. If there is spare capacity, one of the other units can step in to provide the functionality of the unit being replaced. After Step 2, the entire first chassis 100-1 could be removed and replaced while the second chassis 100-2 steps in to perform its functions. Variations on this method are practically infinite, and can also be used for other types of migration, such as when increasing system reliability.

The hardware and methods used in these steps can be arranged to comply with "hot-swap" standards as defined earlier. The system of FIGS. 13A and 13B, and of course any of the systems described above, may further provide automatic sensing of the removal (or failure) of a probe unit (or entire chassis), and automatic re-configuration of switches and re-programming of probe units to resume critical monitoring functions with minimum delay. Preferably, of course, the engineer would instruct the re-programming prior to any planned removal of a probe unit module. A further level of protection, which allows completely uninterrupted operation with minimum staff involvement, is to sense the unlocking of a processing card prior to actual removal, to reconfigure other units to take over the functions of the affected module, and then to signal to the engineer that actual removal is permitted. This will be illustrated further below with reference to FIG. 15A.

Multi-Channel Probe Apparatus—Functional Arrangement

Figure 14:
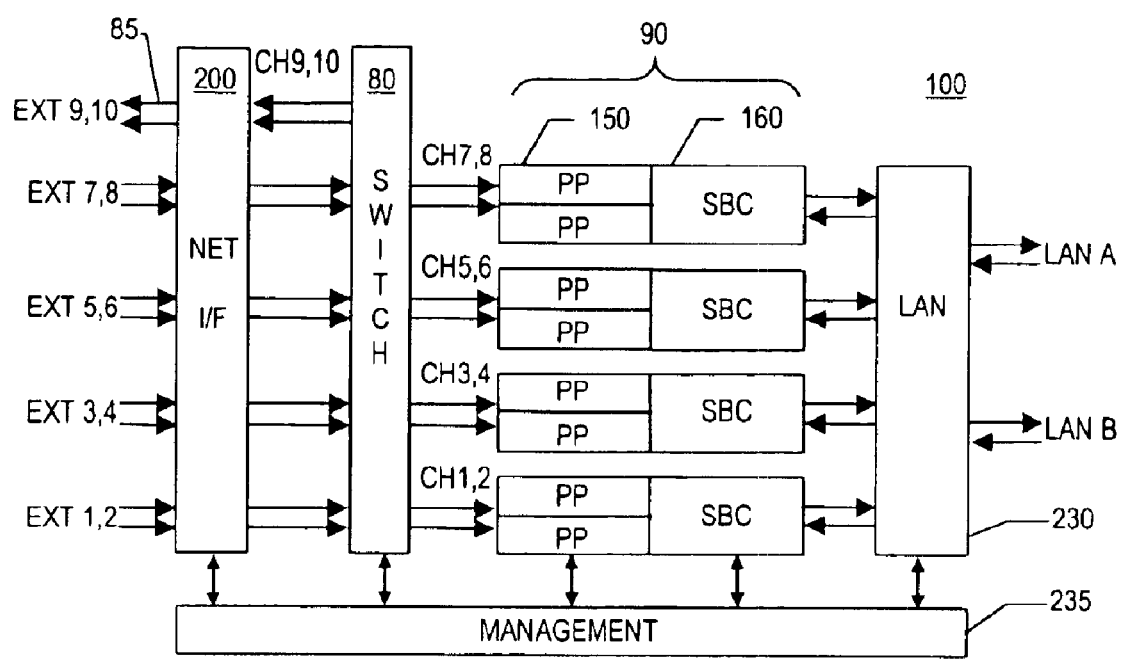
FIG. 14 is a functional schematic diagram of a generalised network probe apparatus showing the functional relationships between the major modules of the apparatus.

FIG. 14 is a functional block schematic diagram of a multi-channel probe apparatus suitable for implementing the systems shown in FIGS. 4 to 13A and 13B. Like numerals depict like elements. All of the modules shown in FIG. 14 and their interconnections are ideally separately replaceable, and housed within a self-contained enclosure of standard rack-mount dimensions. The actual physical configuration of the network probe unit modules in a chassis with special backplane will be described later.

A network interface module 200 provides optical fibre connectors for the incoming bearer signals EXT 1–8 (70-1 to 70-N in FIG. 3), and performs optical to electrical conversion. A cross-point switch 80 provides a means of linking these connections to appropriate probe units 90. Each input of a probe unit can be regarded as a separate monitoring channel CH1, CH2 etc. As mentioned previously, each probe unit may in fact accept plural signals for processing simultaneously, and these may or may not be selectable independently, or grouped into larger monitoring channels. Additional optical outputs EXT 9,10 are provided to act as "spare" outputs (corresponding to 85 in FIG. 4)In the embodiment, each probe unit 90 controls the cross-point switch 80 to feed its inputs (forming channel CH1, 2, 3 or 4 etc.) with a bearer signal selected from among the incoming signals EXT 1–8. This selection may be pre-programmed in the apparatus, or may be set by remote command over a LAN. Each probe unit (90) is implemented in two parts, which may conveniently be realised as a specialised packet processor 150 and a general purpose single board computer SBC 160 module. There are provided four packet processors 150 to 150 each capable of filtering and pre-processing eight half duplex bearer signals at full rate, and four SBCs 160 capable of further processing the results obtained by the packet processors. The packet processors 150 comprise dedicated data processing hardware, while the SBC can be implemented using industry standard processors or other general purpose processing modules. The packet processors 150 are closely coupled by individual peripheral buses to their respective SBCs 160 so as to form self-contained processing systems, each packet processor acting as a peripheral to its "host" SBC. Each Packet Processor150 carries out a high speed time critical cell and packet processing including data aggregation and filtering. A second level of aggregation is carried out in the SBC 160.

LAN and chassis management modules 230, 235 (which in the implementation described later are combined on a single card) provide central hardware platform management and onward communication of the processing results. For this onward communication, multiple redundant LAN interfaces are provided between every SBC 160 and the LAN management module 230 across the backplane. The LAN management function has four LAN inputs (one from each SBC) and four LAN outputs (for redundancy) to the monitoring LAN network. Multiple connections are provided as different SBC manufacturers use different pin connectors on their connectors. For any particular manufacturer there is normally only one connection between the SBC 160 and the LAN management module 230. The dual redundant LAN interfaces are provided for reliability in reporting the filtered and processed data to the next level of aggregation (site processor 40 in FIG. 2). This next level can be located remotely. Each outgoing LAN interface is connectable to a completely independent network, LANA or LANB to ensure reporting in case of LAN outages. In case of dual outages, the apparatus has buffer space for a substantial quantity of reporting data.

The chassis management module 235 oversees monitoring and wiring functions via (for example) an I²C bus using various protocols. Although I²C is normally defined as a shared bus system, each probe unit for reliability has its own I²C connection direct to the management module. The management module can also instruct the cross-point switch to activate the "spare" output (labelled as monitoring channels CH9,10 and optical outputs EXT 9,10) when it detects failure of one of the probe unit modules. This operation can also be carried out under instruction via LAN.

The network probe having the architecture described above must be realised in a physical environment capable of fulfilling the functional specifications and other hardware platform considerations such as the telecommunications environment it is to be deployed in. A novel chassis (or "cardcage") configuration has been developed to meet these requirements within a compact rack-mountable enclosure. The chassis is deployed as a fundamental component of the data collection and processing system.

Multi-Channel Probe Apparatus—Physical Implementation

Figure 15A:
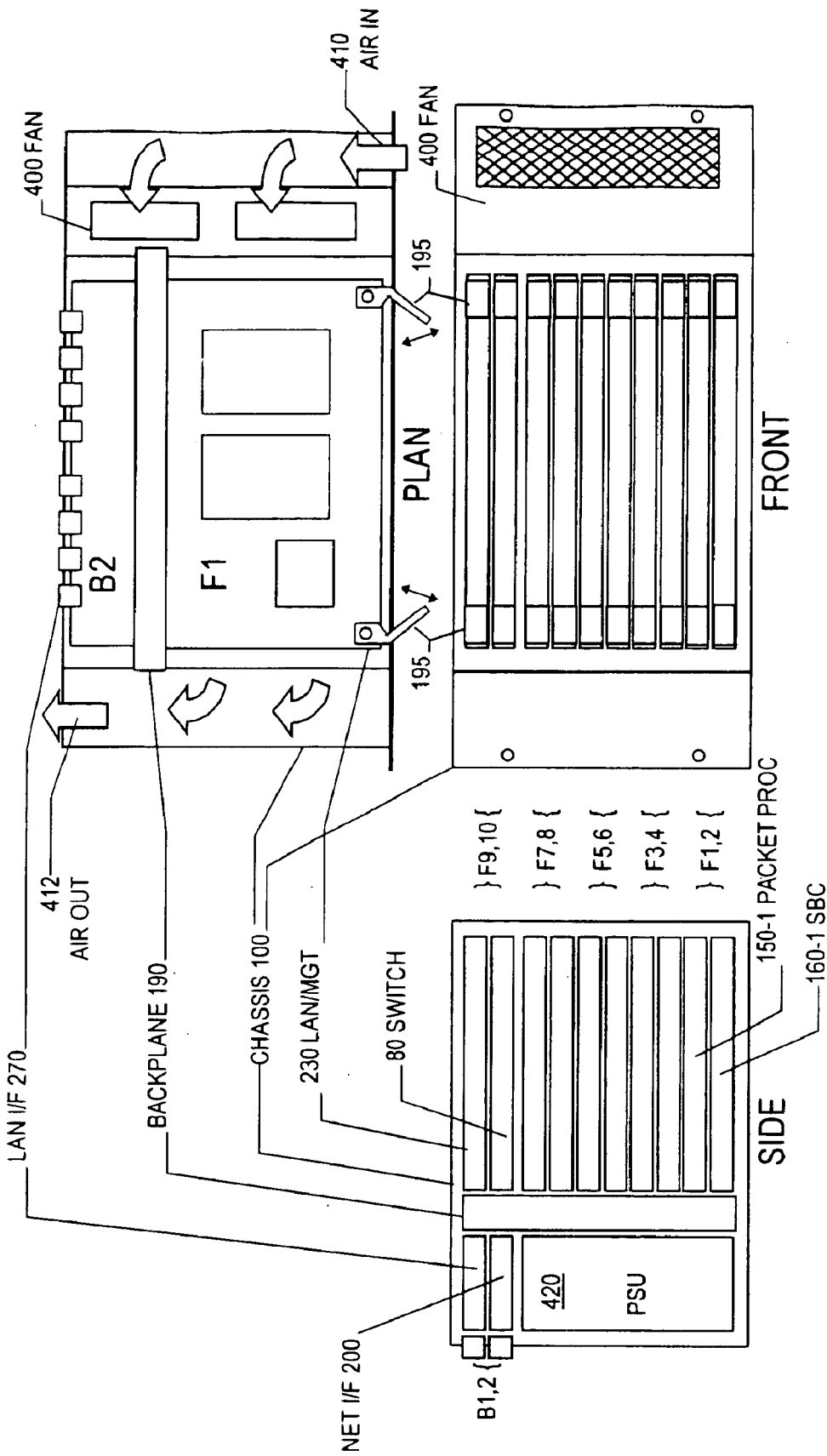
FIG. 15A shows the general physical layout of modules in a specific network probe apparatus implemented in a novel chassis and backplane.
Figure 16:
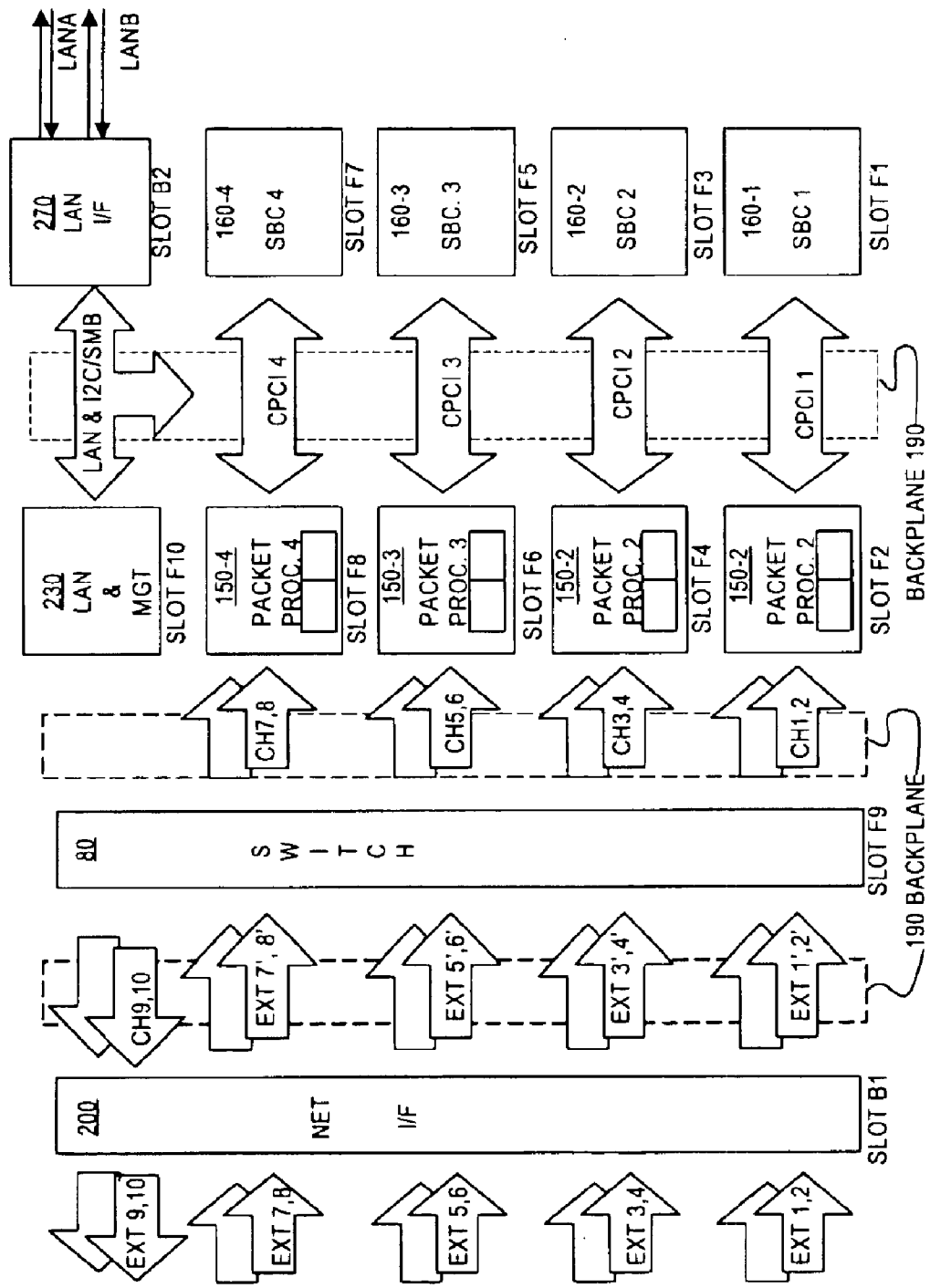
FIG. 16 shows in block schematic form the interconnections between modules in the apparatus of FIGS. 15A–C.

FIGS. 15A, B and C show how the probe architecture of FIG. 14 can be implemented with a novel chassis, in a particularly compact and reliable manner. To support the network probe architecture for this embodiment there is also provided a custom backplane 190. FIG. 16 shows which signals are carried by the backplane, and which modules provide the external connections. Similar reference signs are used as in FIG. 14, where possible.

Referring to FIG. 16 for an overview of the functional architecture, the similarities with the architecture of FIG. 14 will be apparent. The network probe apparatus again has eight external optical terminals for signals EXT 1–8 to be monitored. These are received at a network interface module 200. A cross-point switch module 80 receives eight corresponding electrical signals EXT 1'–8' from module 200 through the backplane 190. Switch 80 has ten signal outputs, forming eight monitoring channels CH1–8 plus two external outputs (CH9,10). Four packet processor modules 150-1 to 150-4 receive pairs of these channels CH 1,2, CH3,4 etc. respectively. CH9,10 signals are fed back to the network interface module 200, and reproduced in optical form at external terminals EXT 9,10. All internal connections just mentioned are made through the backplane via transmission lines in the backplane 190. Each packet processor is paired with a respective SBC 160-1 to 1604 by individual cPCI bus connections in the backplane.

A LAN & Chassis Management module 230 is provided, which is connected to the other modules by I²C buses in the backplane, and by LAN connections. A LAN interface module 270 provides external LAN connections for the onward reporting of processing results. Also provided is a fan assembly 400 for cooling and a power supply (PSU) module 420.

Referring to the views in FIG. 15A chassis 100 carries a backplane 190 and provides support and interconnections for various processing modules. Conventionally, the processing modules are arranged in slots to the "front" of the backplane, and space behind the backplane in a telecommunications application is occupied by specialised interconnect. This specialised interconnect may include further removable I/O cards referred to as "transition cards". The power supply and fans are generally located above and/or below the main card space, and the cards (processing modules) are arranged vertically in a vertical airflow. These factors make for a very tall enclosure, and one which is far deeper than the ideals of 300 mm or so in the NEBS environment. The present chassis features significant departures from the conventional design, which result in a compact and particularly shallow enclosure.

In the present chassis, the power supply module (PSU) 420 is located in a shallow space behind the backplane 190. The processing modules 150-1, 160-1 etc. at the front of the backplane are, moreover, arranged to lie horizontally, with their long axes parallel to the front panel. The cooling fans 400 are placed to one side of the chassis. Airflow enters the chassis at the front at 410 and flows horizontally over the components to be cooled, before exiting at the rear at 412. This arrangement gives the chassis a high cooling capability while at the same time not extending the size of the chassis beyond the desired dimensions. The outer dimensions and front flange of the housing allow the chassis to be mounted on a standard 19 inch (483 mm) equipment rack, with just 5 U height. Since the width of the enclosure is fixed by standard rack dimensions, but the height is freely selectable, the horizontal arrangement allows the space occupied by the enclosure to be matched to the number of processor slots required by the application. In the known vertical orientation, a chassis which provides ten slots must be just as high as one which provides twenty slots, and additional height must be allowed for airflow arrangements at top and bottom.

Referring also to FIGS. 15B and 15C, there are ten card slots labelled F1–F10 on the front side of the backplane 190. There are two shallow slots B1 and B2 to the rear of the backplane 190, back-to back with F9 and F10 respectively. The front slot dimensions correspond to those of the cPCI standard, which also defines up to five standard electrical connectors referred to generally as J1 to J5, as marked in FIGS. 15B and 15C. It will be known to the skilled reader that connectors J1 and J2 have 110 pins each, and the functions of these are specified in the cPCI standard (version PICMG 2.0 R2.1 (May 1st 1998)).

Other connector positions are used differently by different manufacturers.

Eight of the front slots (F1–F8) support the Packet Processor/SBC cards in pairs. The cards are removable using 'hot swap' techniques, as previously outlined, using thumb levers 195 to lock/unlock the cards and to signal that a card is to be inserted/removed. The other two front slots F9 and F10 are used for cross-point switch 80 and LAN/Management card 230 respectively. Slots F1 to F8 comply with the cPCI insofar as connectors J1, J2, J3 and J5 are concerned. Other bus standards such as VME could be also be used. The other slots F9 and F10 are unique to this design. All of the cPCI connections are standard and the connectivity, routing and termination requirements are taken from the cPCI standard specification. Keying requirements are also taken from the cPCI standard. The cPCI bus does not connect all modules, however: it is split into four independent buses CPCI1–4 to form four self-contained host-peripheral processing sub-systems. Failure of any packet processor/SBC combination will not affect the other three probe units.

Each of the cards is hot-swappable and will automatically recover from any reconfiguration. Moreover, by providing switches responsive to operation of the thumb levers195, prior to physical removal of the card, the system can be warned of impending removal of an module. This warning can be used to trigger automatic re-routing of the affected monitoring channel(s). The engineer replacing the card can be instructed to await a visual signal on the front panel of the card or elsewhere, before completing the removal of the card. This signal can be sent by the LAN/Management module 270, or by a remote controlling site. This scheme allows easy operation for the engineer, without any interruption of the monitoring functions, and without special steps to command the re-routing. Such commands might otherwise require the co-ordination of actions at the local site with staff at a central site, or at best the same engineer might be required to move between the chassis being worked upon and a nearby PC workstation.

As mentioned above, the upper two front slots (F10, F9) hold the LAN & Management module 230 and the cross-point switch 80 respectively. Slot B1 (behind F9) carries a Network Transition card forming network interface module 200, while the LAN interface 270 in slot B2 (behind F10) carries the LAN connectors. All external connections are to the apparatus are provided by special transition cards in these rear slots, and routed through the backplane. No cabling needs to reach directly the rear of the individual probe unit slots. No cabling at all is required to the front of the enclosure. This is not only tidy externally of the housing, but leaves a clear volume behind the backplane which can be occupied by the PSU 420, shown cut-away in FIG. 15C, yielding a substantial space saving over conventional designs and giving greater ease of maintenance. The rear slot positions B1, B2 are slightly wider, to accommodate the PSU connectors 422.

The J4 position in the backplane is customised to route high integrity network signals (labelled "RF" in FIG. 15B). These are transported on custom connections not within cPCI standards. FIG. 15B shows schematically how these connectors transport the bearer signals in monitoring channels CH1 etc. from the cross-point switch 80 in slot F9 to the appropriate packet processors 150-1 etc. in slots F2, F4, F6, F8. The external bearer signals EXT1'–8' in electrical form can be seen passing through the backplane from the cross-point switch 80 (in slot F9) to the network interface module 200 (B1). These high speed, high-integrity signals are carried via appropriately designed transmission lines in the printed wiring of the backplane 190. The variation in transmission delay between channels in the chassis is not significant for the applications envisaged. However, in order to avoid phase errors it is still important to ensure that each half of any differential signal is routed from its source to its destination using essentially equal delays. To ensure this, the delays must be matched to the packet processors for each set for the backplane and cross-point switch combination.

It is important to note that these monitoring channels are carried independently on point-to point connections, rather than through any shared bus such as is provided in the H. 110 protocol for computer telephony.

The backplane also carries I²C buses (SMB protocol) and the LAN wiring. These are carried to each SBC 160-1 etc. either in the J3 position or the J5 position, depending on the manufacturer of the particular SBC, as described later. The LAN interface module 270 provides the apparatus with two external LAN ports for communications to the next layer of data processing/aggregation, for example a site processor.

Connectivity is achieved using two LANs (A and B) at 100 BaseT for a cardcage. The LAN I/O can be arranged to provide redundant connection to the external host computer 40. This may be done, for example, by using four internal LAN connection and four external LAN connections routed via different segments of the LAN 60. It is therefore possible to switch any SBC to either of the LAN connections such that any SBC may be on any one connection or split between connections. This arrangement may be changed dynamically according to circumstances, as in the case of an error occurring, and allows different combinations of load sharing and redundancy. Additionally, this allows the probe processors to communicate with each other without going on the external LAN. However, this level of redundancy in the LAN connection cannot be achieved if the total data from the probe processors exceeds the capacity of any one external LAN connection.

An external timing port (not shown in FIG. 16) is additionally provided for accurately time-stamping the data in the packet processor. The signal is derived from any suitable source, for example a GPS receiver giving a 1 pulse per second input. It is also possible to generate this signal using one of the Packet Processor cards, where one Packet Processor becomes a master card and the others can synchronise to it.

The individual modules will now be described in detail, with reference to FIGS. 17 19. This will further clarify the inter-relationships between them, and the role of the backplane 190 and chassis 100.

Cross-Point Switch Module 80

Figure 17:
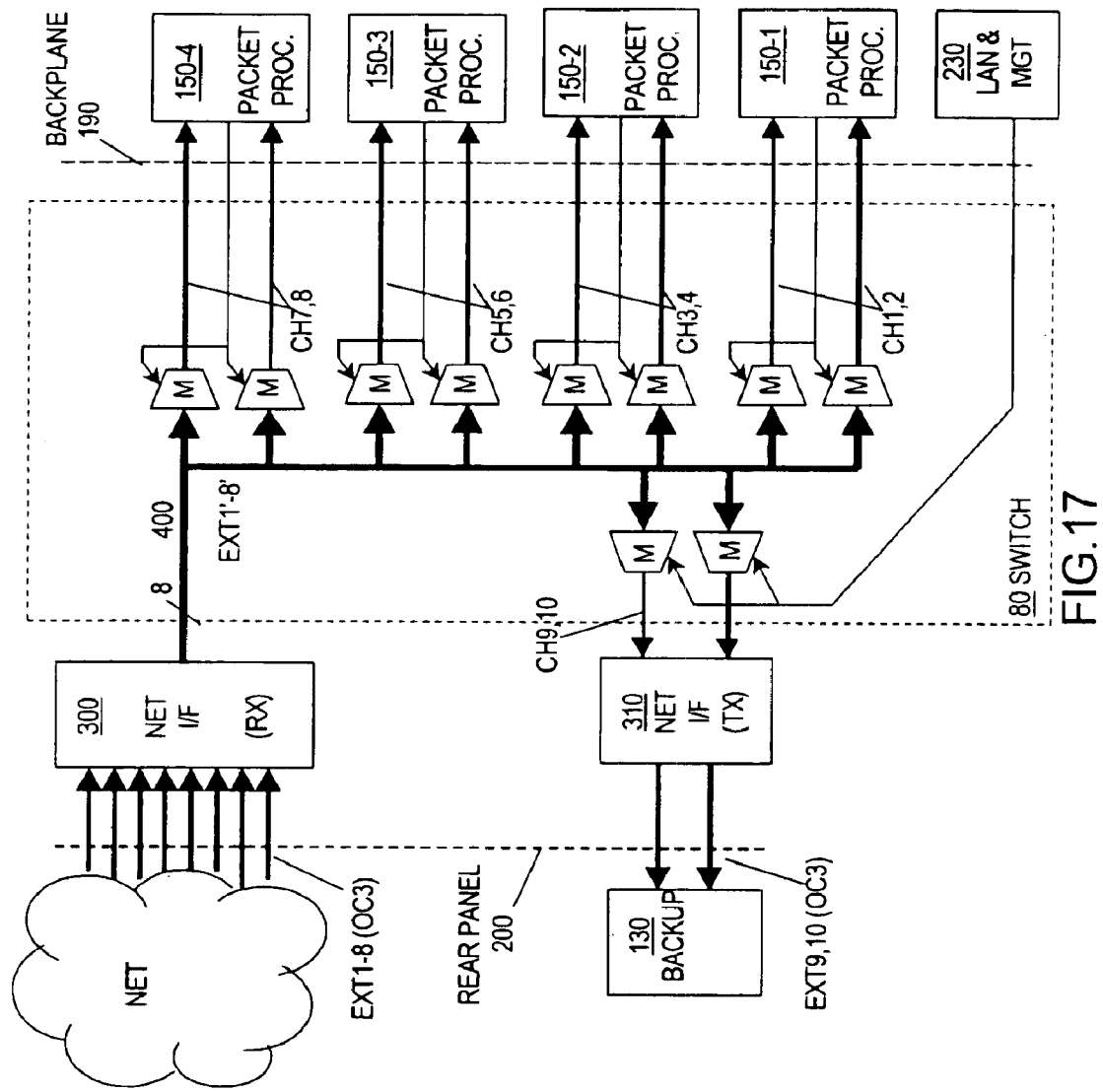
FIG. 17 is a block diagram showing in more detail a cross-point switch module in the apparatus of FIG. 16, and its interconnections with other modules.

FIG. 17 is a block diagram of the cross-point switch 80 and shows also the network line interfaces 300 (RX) and 310 (TX) provided on the network interface module 200. There are eight optical line receiver interfaces 300 provided within module 200. There are thus eight bearer signals which are conditioned on the transition card (module 200) and transmitted in electrical form EXT 1'–8'directly through the backplane 190 to the cross-point switch card 80. Ten individually configurable multiplexers (selectors) M are provided, each freely selecting one of the eight inputs. Each monitoring channel (CH1–8) and hence each packet processor 150 can receive any of the eight incoming network signals (EXT1'–8').

The outputs to the packet processors (CH1–CH4) are via the backplane 190 (position J4, FIG. 15B as described above) and may follow, amongst others, DS3/OC3/OC12/OC48 electrical standards or utilise a suitable proprietary interface. Each packet processor module 150 controls its own pair of multiplexers M directly.

The external optical outputs EXT 9,10 are provided via transmit interface 310 of the module 200 for connecting to a spare chassis (as in FIG. 8). These outputs can be configured to be any of the eight inputs, using a further pair of multiplexers M which are controlled by the LAN/Management Module 230. In this way, the spare processor or chassis 130 mentioned above can be activated in case of processor failure. In an alternative implementation, the selection of these external output signals CH9 and CH10 can be performed entirely on the network interface module 200, without passing through the backplane or the cross-point switch module 80.

Although functionally each multiplexer M of the cross-point switch is described and shown as being controlled by a respective packet processor 150, in the present embodiment this control is conducted via the LAN & management module 230. Commands or requests for a particular connection can be sent to the LAN & management module from the packet processor (or associated SBC 160) via the LAN connections, or I$^2$C buses, provided in connectors J3 or J5.

Packet Processor Module 150

Figure 18:
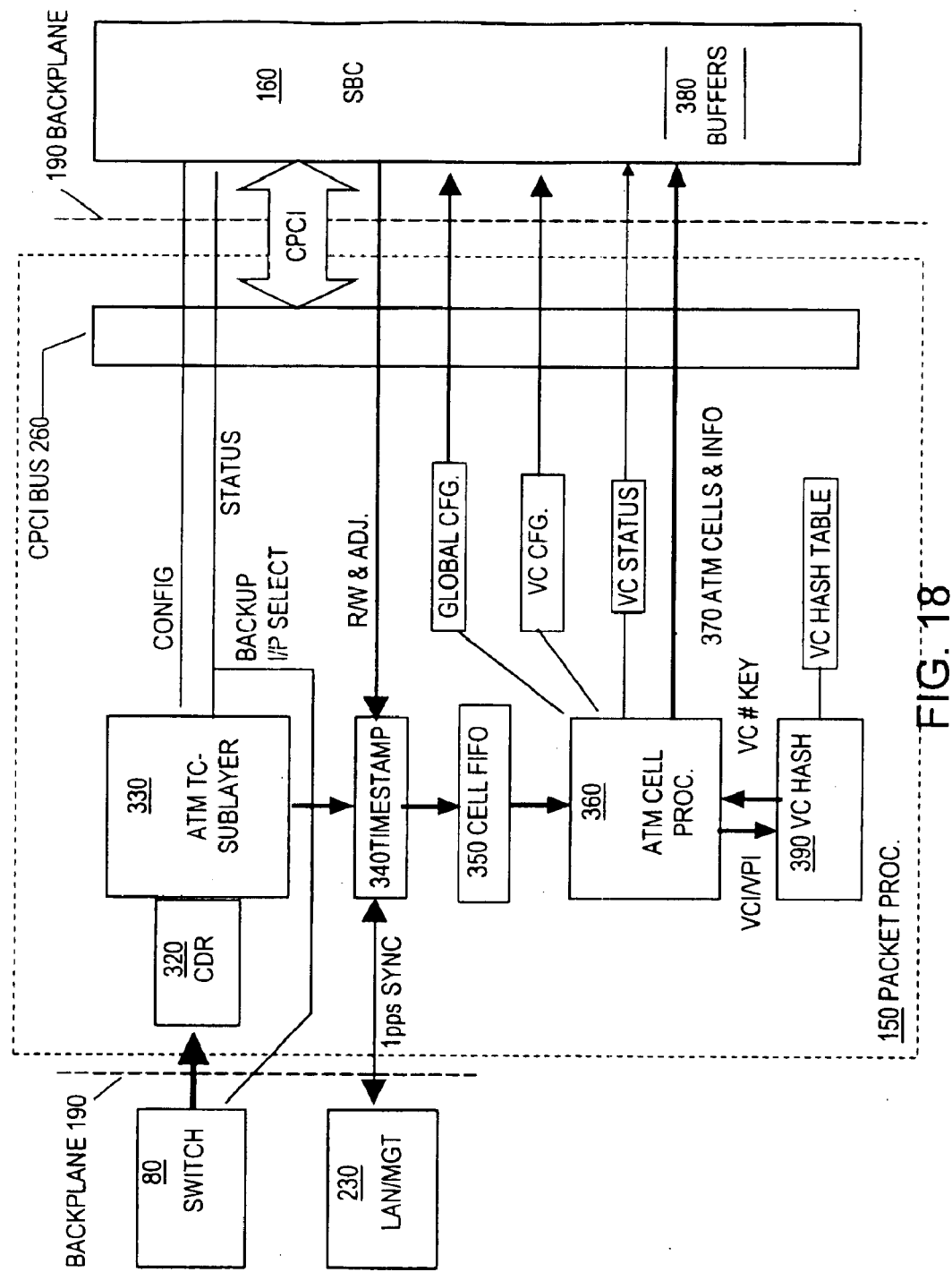
FIG. 18 is a block diagram showing in more detail a packet processor module in the apparatus of FIG. 16, and its interconnections with other modules.

FIG. 18 is a block diagram of one of the Packet Processor modules 150 of the apparatus. The main purpose of packet processor (PP) 150 is to capture data from the network interface. This data is then processed, analysed and filtered before being sent to a SBC via a local cPCI bus. Packet processor 150 complies with Compact PCI Hot Swap specification PICMG-2.1 R 1.0, mentioned above. Packet Processor 150 here described is designed to work up to 622 Mbits/s using a Sonet/SDH frame structure carrying ATM cells using AAL5 Segmentation And Reassembly (SAR). Other embodiments can be employed using the same architecture, for example to operate at OC48 (2.4 Gbit.s$^{-1}$).

The following description makes reference to a single "half" of the two-channel packet processor module 150, and to a single Packet Processor/SBC pair only (single channel). The chassis as described supports four such Packet Processor/SBC pairs, and each packet processor comprises two processing means to handle multiple bearer signals (multiple monitoring channels).

It is possible for the Packet Processor 150 to filter the incoming data. This is essential due to the very high speed of the broadband network interfaces being monitored, such as would be the case for OC-3 and above. The incoming signals are processed by the Packet Processor, this generally taking the form of time stamping the data and performing filtering based on appropriate fields in the data. Different fields can be chosen accordingly, for example ATM cells by VPI/VCI (VC) number, IP by IP address, or filtering can be based on other, user defined fields. It is necessary to provide the appropriate means to recover the clock and data from the incoming signal, as the means needed varies dependent on link media and coding schemes used.

In a typical example using ATM, ATM cells are processed by VPI/VCI (VC) number. The Packet Processor is provided with means 320 to recover the clock and data from the incoming signal bit stream. The data is then 'deframed' at a transmission convergence sub-layer 330 to extract the ATM cells. The ATM cells are then time-stamped 340 and then buffered in a First In First Out (FIFO) buffer 350 to smooth the rate of burst type data. Cells from this FIFO buffer are then passed sequentially to an ATM cell processor 360. The packet processor can store ATM cells to allow it to re-assemble cells into a message—a Protocol Data Unit (PDU). Only when the PDU has been assembled will it be sent to the SBC. Before assembly, the VC of a cell is checked to ascertain what actions should be taken, for example, to discard cell, assemble PDU, or pass on the raw cell.

Data is transferred into the SBC memory using cPCI DMA transfers to a data buffer 380. This ensures the very high data throughput that may be required if large amounts of data are being stored. The main limitation in the amount of data that is processed will be due to the applications software that processes it. It is therefore the responsibility of the Packet Processor 150 to carry out as much pre-processing of the data as possible so that only that data which is relevant is passed up into the application domain.

The first function of the Packet Processor 150 is to locate the instructions for processing the VC (virtual channel or) to which the cell belongs. To do this it must convert the very large VPI/VCI of the cell into a manageable pointer to its associated processing instructions (VC # key). This is done using a hashing algorithm by hash generator 390, which in turn uses a VC hash table. Processor 150, having located the instructions, can then process the cell.

Processing the cell involves updating status information for the particular VC (e.g. cell count) and forwarding the cell and any associated information (e.g. "Protocol Data Unit (PDU) received") to the SBC 160 if required. By reading the status of a particular VC, the processor can vary its action depending on the current status of that VC (e.g. providing summary information after first cell received). Cell processor 360 also requires certain configurable information which is applicable to all of its processing functions regardless of VC (e.g. buffer sizes) and this 'global' configuration is accessible via a global configuration store.

A time stamping function 340 can be synchronised to an external GPS time signal or can be adjusted by the SBC 160. The SBC can also configure and monitor the 'deframer' (e.g. set up frame formats and monitor alarms) as well as select the optical inputs (EXT 1–8) to be monitored. Packet Processor 150 provides all of the necessary cPCI interface functions.

Each packet processor board 150-1 etc. is removable without disconnecting power from the chassis. This board will not impact the performance of other boards in the chassis other than the associated SBC. The microprocessor notifies the presence or absence of the packet processor and processes any signal loss conditions generated by the Packet Processor.

Single Board Computer (SBC) Modules 160

The SBC module 160 is not shown in detail herein, being a general-purpose processing module, examples including the Motorola CPV5350, FORCE CPCI-730, and SMT NAPA. The SBC 150 is a flexible, programmable device. In this specific embodiment two such devices may exist on one cPCI card, in the form of "piggyback" modules (PMCs). The 100 BaseT interfaces, disk memory etc. may also be in the form of PMCs. As already described, communications via the cPCI bus (J1/J2) on the input side and via the LAN port on the output side and all other connections are via the backplane at the rear, unless for diagnostic purposes for which an RS-232 port is provided at the front.

LAN & Chassis Management Module 230

Figure 19:
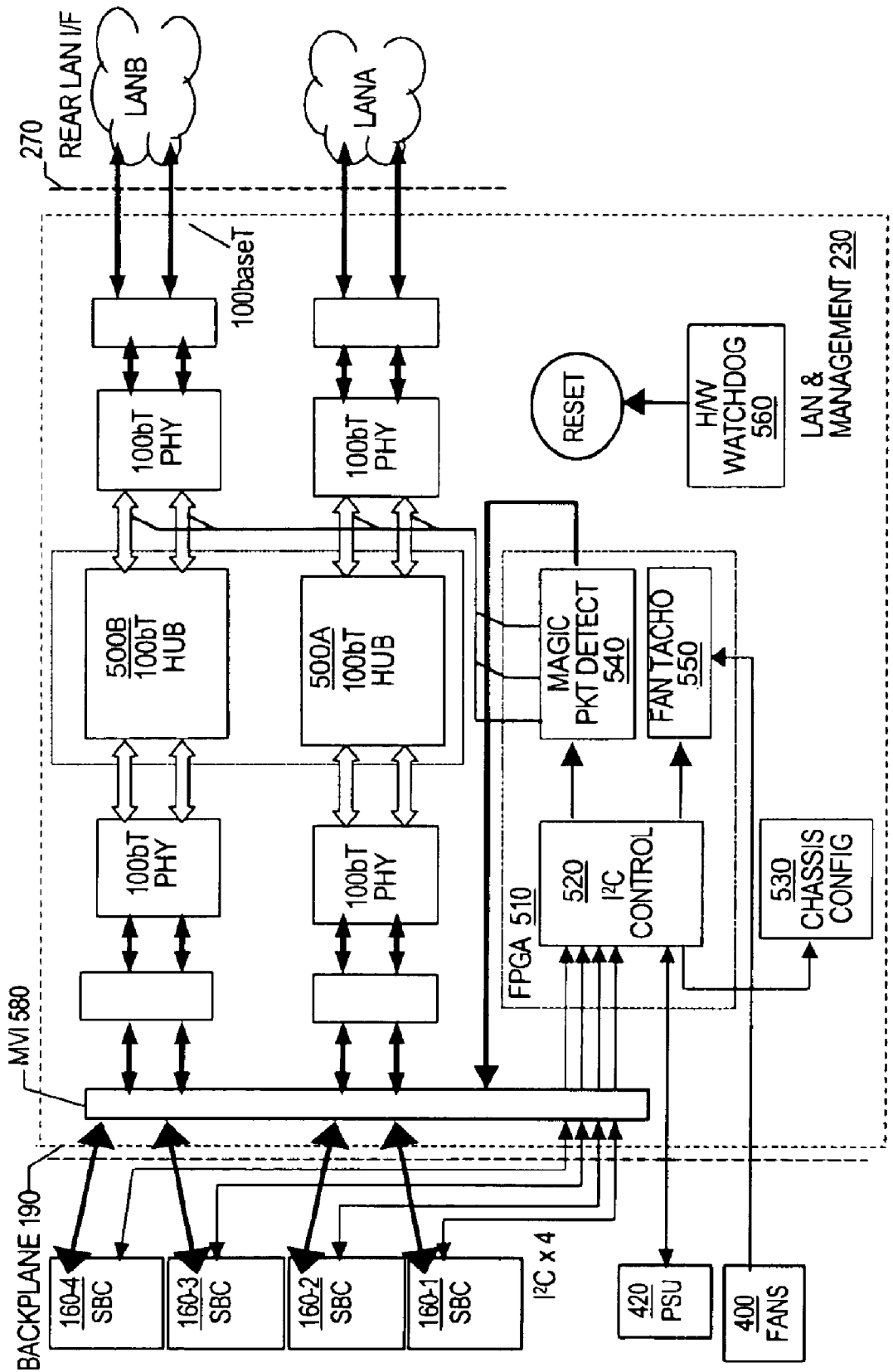
FIG. 19 is a block diagram showing in more detail a combined LAN and chassis management card in the apparatus of FIG. 16.

FIG. 19 is a block diagram of the combined LAN and chassis management card for the network probe as has been described. Module 230 performs a number of key management functions, although the probe units 150/160 can be commanded independently from a remote location, via the LAN interface. The card firstly provides a means for routing probe units SMB and LAN connections, including dual independent LAN switches 500A and 500B to route the LAN connections with redundancy and sufficient bandwidth to the outside world.

On the chassis management side, a Field Programmable Gate Array (FGPA) 510 within this module performs the following functions:

(520) I²C and SMB communications, with reference to chassis configuration storage registers 530

(540) 'magic packet' handling, for resetting the modules remotely in the event that the higher level network protocols "hang up";

(550) environmental control and monitoring of fan speed and PSU & CPU temperatures functions to ensure optimal operating conditions for the chassis, and preferably also to minimise unnecessary power consumption and fan noise;

A hardware watchdog feature 560 is also included to monitor the activity of all modules and take appropriate action in the event that any of them becomes inactive or unresponsive. This includes the ability to reset modules.

Finally, the management module implements at 580 "Multivendor Interconnect", whereby differences in the usage of cPCI connectors pins (or whatever standard is adopted) between a selection of processor vendors can be accommodated.

As mentioned previously, the chassis carries at some locations, cPCI processor modules from a choice of selected vendors, but these are coupled via cPCI bus to special peripheral cards. While such cards are known in principle, and the processor-peripheral bus is fully specified, the apparatus described does not have a conventional interconnect arrangement for the broadband signals, multiple redundant LAN connections and so forth. Even for the same functions, such as the LAN signals and I²C/SMB protocol for hardware monitoring, different SBC vendors place the relevant signals on different pins of the cPCI connector set, particularly they may be on certain pins in J3 with some vendors, and on various locations in J5 with others. Conventionally, this means that system designer has to restrict the user's choice of SBC modules to those of one vendor, or a group of vendors who have adopted the same pin assignment for LAN and SMB functions, besides the standard assignments for J1, and J2 which are specified for all cPCI products.

To overcome this obstacle a modular Multivendor Interconnect (MVI) solution may be applied. The MVI module 580 is effectively four product-specific configuration cards that individually route the LAN and SMB signals received from each SBC 160-1 etc. to the correct locations on the LAN/Management cards. One MVI card exists for each processor. These are carried piggyback on the LAN/management module 230, and each is accessible from the front panel of the enclosure. The backplane in locations J3 and J5 includes sufficient connectors, pins and interconnections between the modules to satisfy a number of different possible SBC types. Needless to say, when replacing a processor card with one of a different type, the corresponding MVI configuration card needs exchanging also.

An alternative scheme to switch the card connection automatically based on vendor ID codes read via the backplane can also be envisaged. In a particular embodiment, for example, the "Geographic Address" pins defined in the cPCI connector specifications may be available for signalling (under control of a start-up program) which type of SBC 160 is in a given slot. The routing of SMB, LAN and other signals can then be switched electronically under control of programs in the LAN & management card 230.

CONCLUSION

Those skilled in the art will recognise that the invention in any of its aspects is not limited to the specific embodiments disclosed herein. In particular, unless specified in the claims, the invention is in no way limited to any particular type of processor, type of network to be monitored, protocol, choice of physical interconnect, choice of peripheral bus (cPCI v. VME, parallel v. serial etc.), number of bearers per chassis, number of bearers per monitoring channel, number of monitoring channels per probe unit. The fact that independent processor subsystems are arranged in the chassis allows multiple data paths from the telecommunications network to the LAN network, thereby providing inherent redundancy. On the other hand, for other applications such as computer telephony, reliability and availability may not be so critical as in the applications addressed by the present embodiment. For such applications, a similar chassis arrangement but with H.110 bus in the backplane may be very useful. Similarly, the cPCI bus, I²C bus and/or LAN interconnect may be shared among all the modules.

Each aspect of the invention mentioned above is to be considered as independent, such that the probe functional architecture can be used irrespective of the chassis configuration, and vice versa. On the other hand, the reader will recognise that the specific combinations of these features offers in a highly desirable instrumentation system, which provides the desired functionality, reliability and availability levels in a compact and scalable architecture.

In the specific embodiments described herein, each probe unit comprising first and second processor modules (the packet processor and SBC respectively) is configured to monitor simplex and duplex bearers. The invention, in any of its aspects, is not limited to such embodiments. In particular, each probe unit may be adapted to process one or more individual bearer signals. In the case of lower speed protocol signals the bearer signals can be multiplexed together (for example within the cross-point switch module 80 or network interface module 200) to take full advantage of the internal bandwidth of the architecture.

What is claimed is:

1. A multi-channel network monitoring apparatus for the monitoring of traffic in a broadband telecommunications network, the apparatus comprising:

a plurality of input connectors for receipt of network signals to be monitored;

a plurality of channel processors mounted within a chassis, each for receiving and processing a respective incoming signal to produce monitoring results for onward communication, the incoming network signals individually or in groups forming channels for the purposes of the monitoring apparatus, each channel processor being arranged to operate independently of each other and being replaceable without interrupting their operation;

one or more communication connectors for onward communication of said monitoring results from the channel processors; and a switching unit;
wherein the input connectors are connected to the channel processors via said switching unit, the switching unit in use routing each incoming signal to a selected channel processor and being operable to re-route an incoming channel to another selected channel processor in the event of processor outage.

2. An apparatus as claimed in claim 1, wherein the switching unit is further operable to connect the same incoming channel simultaneously to more than one channel processor.

3. An apparatus as claimed in claim 1, wherein the channel processors are in the form of modules mounted and interconnected on a common backplane.

4. An apparatus as claimed in claim 3, wherein said switching unit comprises a further module mounted on said backplane.

5. An apparatus as claimed in claim 3, wherein said input connectors are provided by a common interface module.

6. An apparatus as claimed in claim 3, wherein said communication connectors are connected to the channel processors via a communication management module and via the backplane.

7. An apparatus as claimed in claim 6, wherein said connectors and communication management module provide for said onward communication to be implemented over plural independent networks for redundancy.

8. An apparatus as claimed in claim 6, wherein the backplane provides an independent connection between each respective channel processor and the communication management module.

9. An apparatus as claimed in claim 6, wherein the channel processors each comprise a self-contained subsystem of host of peripheral processing modules interconnected via a CPU-peripheral interface in the backplane, the backplane, providing a separate peripheral interface for each channel processor.

10. An apparatus as claimed in claim 9, wherein said CPU-peripheral interface for each channel processor includes a compact PCI interface.

11. An apparatus as claimed in claim 3, wherein said backplane and modules are provided in a single rack-mount chassis, which further houses a power supply and cooling fan.

12. An apparatus as claimed in claim 1, wherein the switching unit further provides for routing any of the incoming channels to a further connector, for processing by a channel processor, external of the apparatus.

13. A network monitoring system wherein a first group of multi-channel network monitoring apparatuses according to claim 1 are connected to receive a plurality of incoming signals, wherein the switching unit of each apparatus in the first group provides for routing any of its incoming channels to a further connector, the system further comprising at least one further multi-channel network monitoring apparatus according to claim 1, connected to receive incoming channels from said further connectors of the first group of apparatuses, the further apparatus thereby providing backup in the event of a channel processor failure or replacement within the first group of apparatuses.

14. A network monitoring system wherein a plurality of multi-channel network monitoring apparatuses as claimed in claim 1 are connected to a larger plurality of incoming channels via multiplexing means, the total number of channel processors within the monitoring apparatuses being greater than the number of incoming channels at any given time, such that any incoming channel can be routed by the multiplexing means and appropriate switching unit to an idle channel processor of one of the monitoring apparatuses.

15. A system as claimed in claim 14, wherein the number of channel processors is greater than the number of incoming channels, by at least the number of channel processors in each monitoring apparatus.

16. A system as claimed in claim 14, wherein said multiplexing means includes electronic switches, while inputs and outputs are converted to and from optical form for interconnection between separate apparatus.

17. A system as claimed in claim 14, further comprising one or more multi-channel optical power splitters, for tapping into active optical communication bearers to obtain the incoming signals for the monitoring apparatuses.

* * * * *